(12) United States Patent
Ishii et al.

(10) Patent No.: US 9,233,709 B2
(45) Date of Patent: Jan. 12, 2016

(54) ELECTRIC POWER STEERING APPARATUS

(71) Applicant: NSK LTD., Tokyo (JP)

(72) Inventors: Tatsuya Ishii, Maebashi (JP); Takeshi Yamamoto, Maebashi (JP); Seiichi Moriyama, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/388,024

(22) PCT Filed: Oct. 28, 2013

(86) PCT No.: PCT/JP2013/079178
§ 371 (c)(1),
(2) Date: Sep. 25, 2014

(87) PCT Pub. No.: WO2014/069423
PCT Pub. Date: May 8, 2014

(65) Prior Publication Data
US 2015/0225011 A1    Aug. 13, 2015

(30) Foreign Application Priority Data

Oct. 29, 2012  (JP) ................................. 2012-237788
Oct. 29, 2012  (JP) ................................. 2012-237789

(51) Int. Cl.
*B62D 5/04*    (2006.01)
(52) U.S. Cl.
CPC ............ *B62D 5/0409* (2013.01); *B62D 5/0403* (2013.01)
(58) Field of Classification Search
CPC ... B62D 5/0403; B62D 5/0409; B62D 5/0406
USPC .......................................................... 180/444
See application file for complete search history.

(56) References Cited

U.S. PATENT DOCUMENTS 7,117,753 B2 *  10/2006  Nakatani .................. B62D 6/10
                                                    73/862.331
2003/0146039 A1 *  8/2003  Sano .................... B62D 5/0409
                                                    180/444

(Continued)

FOREIGN PATENT DOCUMENTS

JP     59 107560 U    7/1984
JP     10-35525  A    2/1998

(Continued)

OTHER PUBLICATIONS

International Search Report dated Dec. 17, 2013 issued by the International Searching Authority in counterpart International Application No. PCT/JP2013/079178 (PCT/ISA/210).

(Continued)

*Primary Examiner* — Tony Winner
(74) *Attorney, Agent, or Firm* — Sughrue Mion, PLLC

(57) ABSTRACT

An electric power steering apparatus has a first rolling bearing and a second rolling bearing rotatably supporting an output shaft. The first rolling bearing is provided between an inner peripheral surface of a through-hole of a gear housing and an outer peripheral surface of the output shaft. The second rolling bearing is provided between an inner peripheral surface of an intermediate plate press-fitted and fixed in an opening portion of the gear housing and the outer peripheral surface of the output shaft. An outer peripheral portion of the intermediate plate has alternately arranged large diameter portions and small diameter portions, and the large diameter portions are press-fitted in the gear housing.

11 Claims, 23 Drawing Sheets

(56) References Cited

U.S. PATENT DOCUMENTS

2005/0257991 A1* 11/2005 Ishii ........................ B62D 3/123
 180/444
2009/0050399 A1* 2/2009 Segawa .................... B62D 1/20
 180/444

FOREIGN PATENT DOCUMENTS

| JP | 2001-138930 A | 5/2001 |
|---|---|---|
| JP | 2002-518242 A | 6/2002 |
| JP | 2003-172332 A | 6/2003 |
| JP | 2006-256499 A | 9/2006 |
| JP | 2007-223501 A | 9/2007 |
| JP | 2007223684 A | 9/2007 |
| JP | 2008-213674 A | 9/2008 |
| JP | 2008540777 A | 11/2008 |
| JP | 2009-298246 A | 12/2009 |
| JP | 2010-247790 A | 11/2010 |
| WO | 2010/013490 A1 | 2/2010 |

OTHER PUBLICATIONS

Communication dated Jul. 28, 2015, issued by the Japanese Intellectual Property Office in counterpart Japanese Application No. 2013-556697.

* cited by examiner

42a(43a)

42b(43b)

42c(43c)

ELECTRIC POWER STEERING APPARATUS

TECHNICAL FIELD

The invention relates to an electric power steering apparatus having an electric motor as an auxiliary power source and reducing a steering force with which a user operates a steering wheel.

BACKGROUND ART

As shown in FIG. 20, a steering apparatus for an automobile is configured such that rotation of a steering wheel 1 is transmitted to an input shaft 3 of a steering gear unit 2, a pair of left and right tie-rods 4, 4 is pushed/pulled in connection with rotation of the input shaft 3 and a steering angle is thus applied to front wheels. The steering wheel 1 is supported and fixed to a rear end portion of a steering shaft 5. The steering shaft 5 is rotatably supported to a cylindrical steering column 6 with being axially inserted into the steering column 6. A front end portion of the steering column 6 is connected and fixed to a rear end portion of a housing 9 in which a worm decelerator 7, a torque measuring device 8 (see FIG. 21) and the like configuring an electric power steering apparatus are accommodated. An electric motor 10 that is a driving source of the electric power steering apparatus is supported and fixed to the housing 9.

When the steering shaft 5 is rotated by the steering wheel 1, a direction and amplitude of torque applied to the steering shaft 5 are measured by the torque measuring device 8. The torque measuring device 8 has an input shaft 12, an output shaft 13 and a displacement measuring device 14 (see FIG. 21) that is configured to measure a relative displacement amount as regards a rotating direction between the input shaft 12 and the output shaft 13. The input shaft 12 and the output shaft 13 are rotatably supported in the housing 9 and are connected to each other by a torsion bar 11. Since the configuration and operation of the torque measuring device 8 are well known, the detailed descriptions thereof are omitted. Based on a measurement result of the torque measuring device 8, the electric motor 10 applies auxiliary torque to the output shaft 13 in the same direction as the operation direction of the steering wheel 1, thereby rotating the output shaft 13 with torque larger than the torque input to the input shaft 12 from the steering shaft 5.

A front end portion of the output shaft 13 is coupled to a rear end portion of an intermediate shaft 16 via a universal joint 15a and a front end portion of the intermediate shaft 16 is coupled to the input shaft 3 via a separate universal joint 15b. In the specification, a front-rear direction is a front-rear direction in a state in which the electric power steering apparatus is mounted on a vehicle, and includes an inclined case relative to a horizontal direction. A tilt mechanism configured to adjust an upper-lower position of the steering wheel 1 and a telescopic mechanism configured to adjust a front-rear position thereof are mounted to the steering apparatus for an automobile shown in FIG. 20. An intermediate portion of the steering column 6 is supported to a support bracket 18 supported to a vehicle body 17 so that an upper-lower position and a front-rear position thereof can be adjusted. In order to configure the tilt mechanism, a support cylinder 19 is provided at a front-upper end portion of the housing 9 and is supported to the vehicle body 17 so that it can be swing-displaced about a horizontal axis. In order to configure the telescopic mechanism, the steering shaft 5 has an inner shaft and an outer shaft that are combined to transmit the torque and to be expandable and contractible, and the steering column 6 has an outer column and an inner column that are combined to be expandable and contractible.

As a more specific structure of the electric power steering apparatus as described above, FIG. 21 shows a structure disclosed in Patent Document 1 and FIG. 22 shows a structure disclosed in Patent Document 2. First, in the structure shown in FIG. 21, a housing 9a for accommodating components except for the electric motor 10 (see FIG. 20) of the electric power steering apparatus is configured by combining a gear housing 20 and a housing cover 21. The output shaft 13 is rotatably supported in the housing 9a by a front-side rolling bearing 22 that is held on an inner peripheral surface of a front end portion of the gear housing 20 and a rear-side rolling bearing 23 that is held on an inner peripheral surface of a front end portion of the housing cover 21. The input shaft 12 is rotatably supported in the housing cover 21 by a separate rolling bearing 24 (a radial needle bearing) that is held on an inner peripheral surface of an intermediate portion of the housing cover 21.

In the structure shown in FIG. 22, a partition plate 25 is fitted at a portion of an inner side of a gear housing 20a near the rear end. An elastic material 26 is interposed between an outer peripheral surface of the partition plate 25 and an inner peripheral surface of the gear housing 20a. An output shaft 13a is rotatably supported in the housing 9a by a front-side rolling bearing 22a that is held on an inner peripheral surface of a front end portion of the gear housing 20a and a rear-side rolling bearing 23a that is held on an inner peripheral surface of the partition plate 25. An input shaft 12a is rotatably supported in a housing cover 21a by a separate rolling bearing 24a. Since the structure shown in FIG. 22 does not have a telescopic mechanism, both a steering shaft 5a and a steering column 6a are not a telescopic type.

In the structure shown in FIG. 21, the housing 9a is configured by combining the gear housing 20 and the housing cover 21 and the output shaft 13 is rotatably supported in the housing 9a by the front-side and rear-side rolling bearings 22, 23. The corresponding operations are troublesome, so that manufacturing efficiency of the electric power steering apparatus is lowered.

In contrast, in the structure shown in FIG. 22, there is no troublesome assembling operation as described above. However, it is difficult to maintain positioning precision of the output shaft 13a for a long time. That is, when the elastic material 26 provided between the outer peripheral surface of the partition plate 25 and the inner peripheral surface of the gear housing 20a is deteriorated due to longtime using and the elasticity thereof is lowered, the partition plate 25 may slip. When the partition plate 25 slips, an engaging resistance between a worm and a worm wheel of the worm decelerator 7a is increased or the detection precision of the torque measuring device 8a is degraded, which lowers the performance of the electric power steering apparatus.

PRIOR ART DOCUMENTS

Patent Document 1: JP2009-298246A
Patent Document 2: JP2002-518242A

SUMMARY OF INVENTION

Problem to be Solved by Invention

An object of the invention is to provide an electric power steering apparatus that can be easily assembled and can keep sufficient performance for a long time.

Means for Solving the Problem

According to an aspect of the invention, an electric power steering apparatus includes an output shaft, a gear housing, a first rolling bearing and a rolling bearing, a housing cover, and an intermediate plate. The output shaft rotates to apply a steering angle to wheels. The gear housing has a through-hole inside which the output shaft is rotatably supported, and is configured to accommodate a decelerator which reduces a speed of a rotation of a driving shaft of an electric motor to transmit the rotation to the output shaft. The first rolling bearing and the second rolling bearing are spaced from each other in an axial direction of the output shaft to rotatably support the output shaft on the gear housing. The housing cover is coupled to and secured to the gear housing, and is configured such that an input shaft is inserted therein, the input shaft being rotated by a steering shaft to be rotated based on an operation of a steering wheel.

The first rolling bearing is provided between an inner peripheral surface of the through-hole and an outer peripheral surface of the output shaft. The second rolling bearing is provided between an inner peripheral surface of the intermediate plate and the outer peripheral surface of the output shaft. The intermediate plate has a plurality of large diameter portions and a plurality of small diameter portions, and the large diameter portions and the small diameter portions are alternately arranged in a circumferential direction on an outer peripheral portion of the intermediate plate. The large diameter portions are press-fitted to a rear portion of an inner peripheral surface of the gear housing by an interference fit such that the intermediate plate is supported and fixed in the gear housing.

The rear portion of the inner peripheral surface of the gear housing may have a rearwardly facing step surface, and a front surface of the outer peripheral portion of the intermediate plate may abut on the step surface such that the intermediate plate is positioned in the axial direction of the output shaft relative to the gear housing.

A front end surface of the housing cover may abut on a rear surface of the outer peripheral portion of the intermediate plate.

The rear surface of the outer peripheral portion of the intermediate plate may be formed with a ridge in a circumferential direction, and the ridge may be flattened by the front end surface of the housing cover.

The rear surface of the outer peripheral portion of the intermediate plate may be formed with a plurality of projections in a circumferential direction, and the projections may be flattened by the front end surface of the housing cover.

The rear portion of the inner peripheral surface of the gear housing may have a rearwardly facing step surface, a ridge may be provided at a portion of a front surface of the intermediate plate facing the step surface, and the ridge may abut on the step surface in a flattened manner.

A front end surface of the housing cover may abut on a rear surface of the outer peripheral portion of the intermediate plate.

The first rolling bearing may be provided on an intermediate portion of the output shaft, and the second rolling bearing may be provided on a portion of the output shaft closer to a rear end of the output shaft than the intermediate portion.

The intermediate plate may be made by an injection molding of a thermosetting resin or a thermoplastic resin containing glass fibers.

Effects of Invention

One of the two rolling bearings that rotatably support the output shaft to the gear housing is provided between the inner peripheral surface of the intermediate plate and the outer peripheral surface of the output shaft. Since the intermediate plate is mounted in a state in which the rolling bearings can be checked with naked eyes, before the housing cover is mounted, it is possible to easily assemble the electric power steering apparatus.

The large diameter portions and the small diameter portions of the intermediate plate are alternately provided in the circumferential direction on the outer peripheral portion of the intermediate plate and the large diameter portions are press-fitted in the rear portion of the inner peripheral surface of the gear housing, so that it is possible to easily perform the press-fitting operation. That is, even when a difference (interference) between an inner diameter of the rear part of the gear housing and an outer diameter of the intermediate plate at a free state is not regulated with high precision, it is possible to press-fit the intermediate plate into the rear pan of the gear housing and it is possible to securely keep the intermediate plate in the rear part (it is possible to improve robustness).

The intermediate plate is press-fitted and fixed on the rear part inner peripheral surface of the gear housing by the interference fit. Thereby, it is possible to maintain the performance of the electric power steering apparatus for a long time. That is, since the intermediate plate is press-fitted and fixed in the gear housing, a posture of the rolling bearing, which is held on the inner peripheral surface of the intermediate plate, is not changed even after the longtime using. For this reason, a posture of the output shaft, which is rotatably supported by the rolling bearings, is not changed even after the longtime using, so that an engaged state of the decelerator is not degraded and the measuring precision of the torque measuring device is not deteriorated.

EMBODIMENTS OF INVENTION

Figure 20:
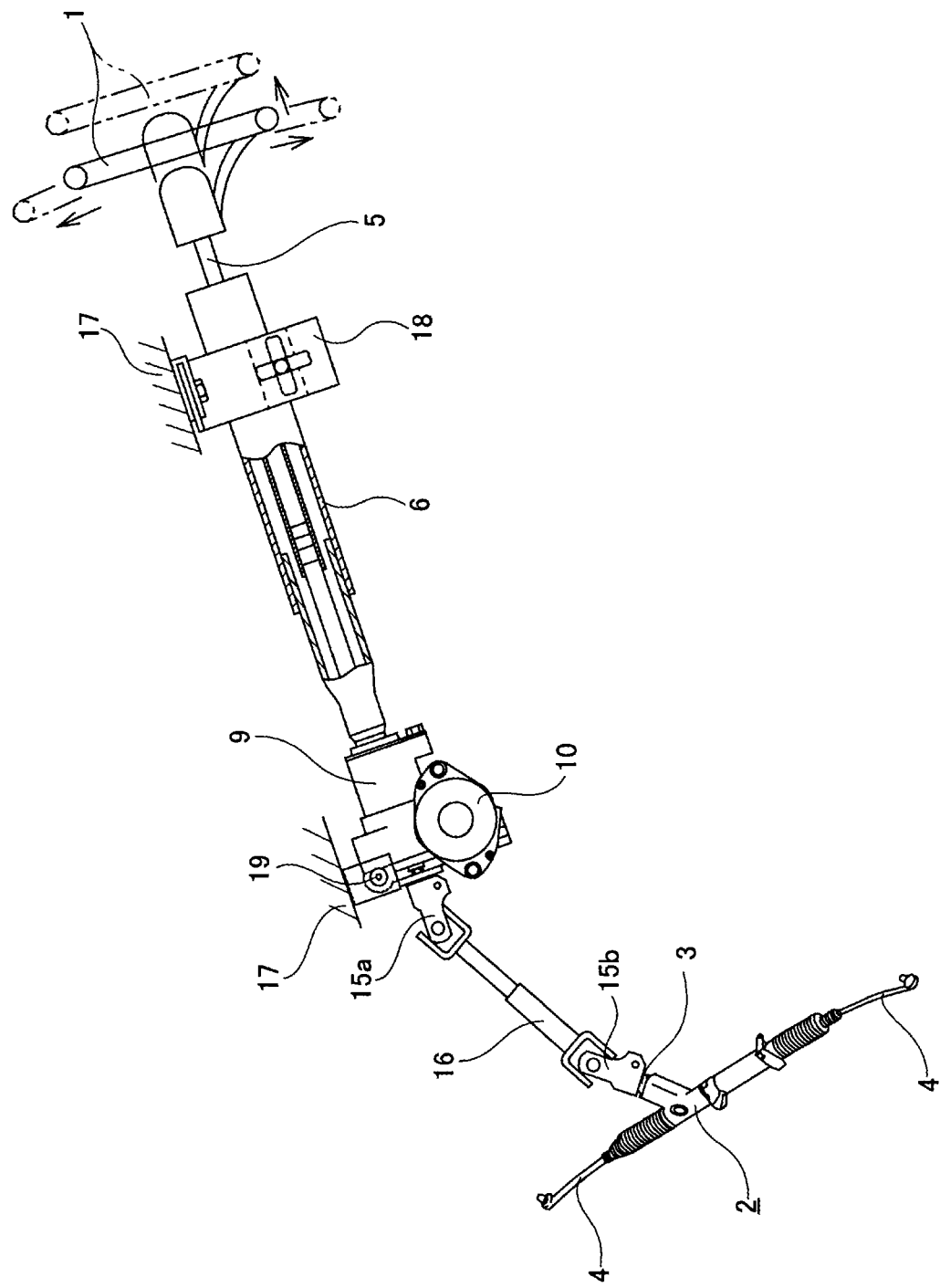
FIG. 20 is a partially cut side view showing an example of an electric power steering apparatus.
Figure 21:
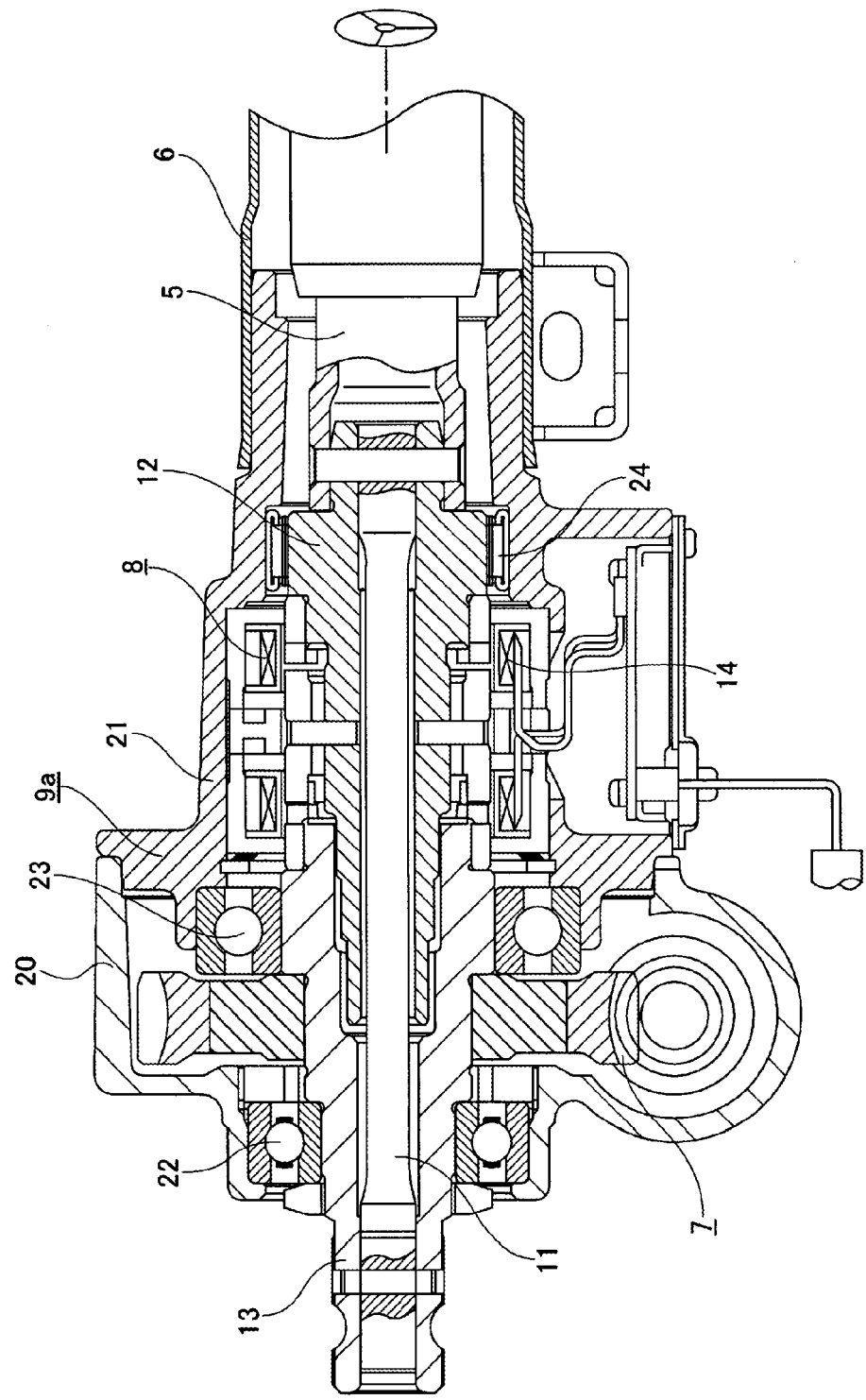
FIG. 21 is a partial sectional view of an electric power steering apparatus according to the first conventional art.
Figure 22:
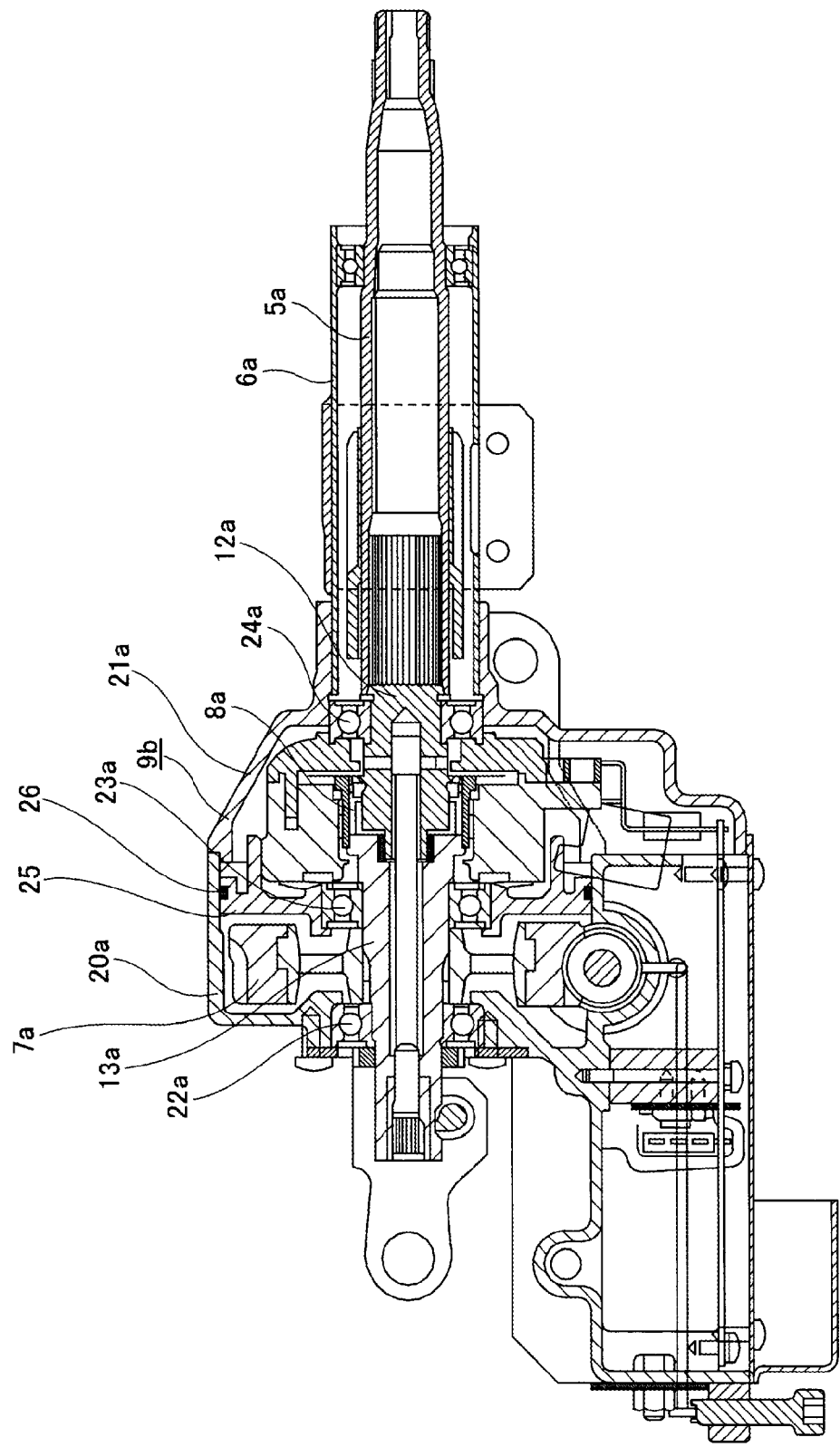
FIG. 22 is a partial sectional view of an electric power steering apparatus according to the second conventional art.

FIGS. 1 to 8 show an electric power steering apparatus according to a first embodiment of the invention. The electric power steering apparatus has an input shaft 12b, an output shaft 13b and a housing 9 that rotatably supports the input shaft 12b and the output shaft 13b. The housing 9 is configured by combining a gear housing 20b and a housing cover 21b. Each of the gear housing 20b and the housing cover 21b is formed by a die-casting molding using an aluminum alloy or injection molding using a high-functional resin, for example. The input shaft 12b and the output shaft 13b are formed to have a hollow circular tube shape and are connected by a torsion bar 11 with being concentrically arranged. That is, front and rear end portions of the torsion bar 11 are respectively connected to a front end portion of the output shaft 13b and a rear end portion of the input shaft 12b. The output shaft 13b is coupled to an input shaft 3 (see FIG. 20) of a steering gear unit 2 via universal joints 15a, 15b and an intermediate shaft 16 and is configured to rotate the input shaft 3 in a predetermined direction by a predetermined amount, thereby applying a predetermined steering angle to front wheels. The input shaft 12b can be rotated by a steering shaft 5.

Upon the steering, the input shaft 12b and the output shaft 13b are relatively displaced in a rotating direction while elastically deforming the torsion bar 11 in a torsion direction by steering torque applied to the input shaft 12b and a resistance against rotation of the output shaft 13b. The relative displacement amount is measured by a torque measuring device 8b provided between an outer peripheral surface of an intermediate portion of the input shaft 12b and an outer peripheral surface of a rear end portion of the output shaft 13b. A measurement signal of the torque measuring device 8b is transmitted to a controller for controlling energization to an electric motor 10 (see FIG. 20). The controller controls an energization direction and an energization amount to the electric motor 10 and applies steering assist force to the output shaft 13b through a worm decelerator 7a. In the meantime, a radial needle bearing 27 is provided between an outer peripheral surface of the front end portion of the input shaft 12b and a portion an inner peripheral surface of the output shaft 13b near the rear end, thereby ensuring the concentricity of both the shafts 12b, 13b.

An intermediate plate 28 that is made in the same manner as the gear housing 20b and the housing cover 21b is press-fitted and fixed in a housing 9c by interference fit. Using the intermediate plate 28, an intermediate portion of the output shaft 13b is supported at a location relatively closer to the rear end. The intermediate plate 28 has a plurality of large diameter portions 29 and a plurality of small diameter portions 30. The large diameter portions 29 and the small diameter portions 30 are alternately arranged in a circumferential direction on an outer peripheral portion of the intermediate plate 28. In the shown example, the six large diameter portions 29 and the six small diameter portions 30 are provided. The respective large diameter portions 29 are press-fitted on an inner peripheral surface of a rear part of the gear housing 20b by the interference fit, so that they are supported and fixed in the gear housing 20b.

In order to press-fit and fix the intermediate plate 28 at a predetermined position in the housing 9c, a portion of an inner peripheral surface of the gear housing 20b near the rear end opening is provided with a rearwardly facing step surface 31. A rear-side part of the step surface 31 of the inner peripheral surface of the gear housing 20b has a cylindrical shape having a step at which a small diameter cylindrical surface part 32 near the step surface 31 and a large diameter cylindrical surface part 33 of an opening-side distant from the step surface 31 are made to continue by a small step part. An outer diameter of each large diameter portions 29 on the outer peripheral edge of the intermediate plate 28 at a free state is made to be slightly larger than an inner diameter of the small diameter cylindrical surface part 32 at a free state. An inner diameter of the large diameter cylindrical surface part 33 at a free state is made to be slightly larger than the outer diameter of each large diameter portions 29 at a free state. The intermediate plate 28 is press-fitted to the small diameter cylindrical surface part 32 at the large diameter portions 29 and a front surface of the outer peripheral portion of the intermediate plate 28 abuts on the step surface 31, so that the intermediate plate 28 is press-fitted and fixed in position inside the housing 9c.

A rear end opening portion of the gear housing 20b is blocked by the housing cover 21b. The outer peripheral surface of the gear housing 20b and the outer peripheral surface of the housing cover 21b are provided with coupling flanges 34a, 34b at two diametrically opposite locations at which they are engaged to each other, respectively. The intermediate plate 28 is press-fitted and fixed in the gear housing 20b, the front end portion of the housing cover 21b is fitted in the large diameter cylindrical surface part 33 of the rear end opening portion of the gear housing 20b without play, and a front surface of a flange portion 35 formed on the outer peripheral surface of the housing cover 21b near the front end is pressed against a rear end surface of the gear housing 20b. In this state, bolts inserted into through-holes formed in the respective coupling flanges 34a, 34b and nuts (not shown) are screwed and fastened to connect and fix the gear housing 20b and the housing cover 21b each other, thereby configuring the housing 9c.

The output shaft 13b is rotatably supported in the gear housing 20b, which is assembled as described above and has the intermediate plate 28 press-fitted and fixed therein, by front-side and rear-side rolling bearings 22b, 23b. First, an outer ring of the front-side rolling bearing 22b is fitted into a through-hole 36, which is formed on a central part of the gear housing 20b along the front-rear direction and has a step surface formed to face the rear at an intermediate portion of an inner peripheral surface thereof, from the rear and is prevented from being separated by a radially outer snap ring 37. An inner ring of the front-side rolling bearing 22b is fitted onto the output shaft 13b from the front together with a worm wheel 38 of the worm decelerator 7a and a rear surface inner peripheral portion of the worm wheel 38 is butted on a forwardly facing step surface formed on the outer peripheral surface of the output shaft 13b and is prevented from being separated by a radially inner snap ring 39.

An outer ring of the rear-side rolling bearing 23b is fitted and fixed to an inner side of a cylindrical portion 40 formed on a central part of the intermediate plate 28 by interference fit. A plurality of reinforcement ribs 41 arranged side by side in the circumferential direction is formed between an outer peripheral surface of the cylindrical portion 40 and a front surface of the intermediate plate 28, thereby securing rigidity of the cylindrical portion 40 and also supporting rigidity of the rear-side rolling bearing 23b. Each of the reinforcement ribs 41 extends in the radial direction and protrudes in the axial direction. An inner ring of the rear-side rolling bearing 23b is fitted and secured onto a large diameter portion, which is formed on a portion of the intermediate portion of the output shaft 13b near the rear end and has an outer diameter larger than both front and rear sides thereof, by the interference fit. A rear surface of an inner peripheral portion of the worm wheel 38 is butted to a step surface continuing from a front end edge of the large diameter portion.

A location of the cylindrical portion 40 of the intermediate plate 28 and a location of the outer peripheral portion of the intermediate plate 28 are shifted from each other in the axial direction. By the configuration, it is possible to reduce a radial compressive force, which is applied to the outer ring of the rear-side rolling bearing 23b when the intermediate plate 28 made of the resin is radially expanded and contracted due to heat. The inner ring of the rear-side rolling bearing 23b may be fitted to the outer side of the output shaft 13b by a gap fitting. The gap fitting absorbs axial thermal deformation of the intermediate plate 28. That is, the rear-side rolling bearing 23b is not influenced by the axial thermal deformation of the intermediate plate 28. Therefore, the performance of the electric power steering apparatus is not also influenced by the axial thermal deformation of the intermediate plate 28.

In order to rotatably support the output shaft 13b in the housing 9c so as to assemble the structure of this example configured as described above, the front-side rolling bearing 22b is held in the through-hole 36 of the gear housing 20b. In this state, the radially outer snap ring 37 is also mounted. Since the corresponding operations are performed before the other members are mounted in the gear housing 20b, the operations can be easily performed.

The worm wheel 38, the rear-side rolling bearing 23b and the intermediate plate 28 are mounted to the portion the outer peripheral surface of the output shaft 13b near the rear end. The input shaft 12b is also coupled to the output shaft 13b via the torsion bar 11 and the torque measuring device 8b is also mounted. Also, as required, the input shaft 12b and the steering shaft 5 are coupled to each other. Since these operations are also performed before the output shaft 13b is mounted in the gear housing 20b, the operations can be easily performed. In the meantime, the housing cover 21b is loosely fitted on the outer side of the steering shaft 5 in advance, as required, and is rearwards moved so as not to disturb the assembling operation of the other members.

Then, while the respective large diameter portions 29 formed on the outer peripheral portion of the intermediate plate 28 are press-fitted to the small diameter cylindrical surface part 32 of the gear housing 20b, the output shaft 13b is inserted into the inner ring of the front-side rolling bearing 22b from the rear towards the front, such that the rear end surface of the inner ring and a front end surface of a radially inner-side end portion of the worm wheel 38 abut each other. Since the respective large diameter portions 29 and the small diameter cylindrical surface part 32 are fitted to each other only at parts in the circumferential direction (in the shown example, a range smaller than a half of an entire circumference), it is possible to easily press-fit the intermediate plate 28 into the small diameter cylindrical surface part 32. Specifically, even when an interference, which is a difference between the inner diameter of the small diameter cylindrical surface part 32 and the outer diameter of each large diameter portion 29, is not strictly regulated, it is possible to easily press-fit the intermediate plate 28 into the small diameter cylindrical surface part 32 and it is possible to sufficiently secure the support strength of the intermediate plate 28 to the gear housing 20b after the press-fitting.

In a state in which the intermediate plate 28 is press-fitted in the gear housing 20b, since the output shaft 18b sufficiently protrudes forwards more than the inner ring of the front-side rolling bearing 22b until the outer peripheral portion of the front surface of the intermediate plate 28 abuts on the step surface 31, the radially inner snap ring 39 is mounted. After that, the housing cover 21b is forward moved to fit the front end portion of the housing cover 21b into the large diameter cylindrical surface part 33 of the rear end portion inner peripheral surface of the gear housing 20b and to butt the front surface of the flange portion 35 to the rear end surface of the gear housing 20b. Also, the coupling flanges 34a, 34b are matched with each other as regards the phases thereof and are connected and fixed by the bolts and nuts or by screwing and fastening the bolts, which are inserted into the through-holes formed at the one coupling flanges 34b, 34b, into screw-holes formed at the other coupling flanges 34b, 34b. The series of operations are easy because an operator can perform the operations while seeing the same with naked eyes. In the meantime, the worm wheel 38 and a worm (not shown in FIG. 1), which configure the worm decelerator 7a, are engaged with each other by rotating the worm when mounting the electric motor 10 to the gear housing 20b. This is the same as the related art.

In the assembled electric power steering apparatus, the intermediate plate 28 is securely supported and fixed in the housing 9c configured by the gear housing 20b and the housing cover 21b. Therefore, a posture of the rear-side rolling bearing 23b, which is held on the inner peripheral surface of the cylindrical portion 40 of the intermediate plate 28, is not changed even after the longtime using. For this reason, a posture of the output shaft 13b, which is rotatably supported by the rear-side rolling bearing 23b and the front-side rolling bearing 22b, is not changed even after the longtime using. As a result, the engaged state of the worm decelerator 7a is not degraded and the measuring precision of the torque measuring device 8b is not deteriorated.

The intermediate plate 28 may be made by the injection molding of a synthetic resin. The synthetic resin that can be preferably used includes a thermosetting resin or thermoplastic resin containing reinforced fibers of about 20 to 60 capacity %.

That is, as the resin, it is preferable to use a resin that consists of a resin composition of which mechanical properties are less lowered and which can be continuously used even at temperature environments of −40° C. to 85° C. that are using environmental temperatures at a column part of the electric power steering apparatus, that has the high size stability so as to suppress a gap between members and compression due to the expansion, specifically has a linear expansion coefficient of $1.2 \times 10^{-5}$ to $5.5 \times 10^{-5}$ (1/° C.) in both longitudinal and transverse directions of fibers within a temperature range of 23° C. to 80° C. and that has a water absorption rate of 4% or lower when it is left in water at 23° C. for 24 hours.

Also, when exposed to high-temperature and high-humidity environments for a long time upon carrying of the intermediate plate, the resin part may be damaged by the lowering of the mechanical properties, which is caused due to moisture absorption deterioration of the intermediate plate made of the resin.

Therefore, the resin preferably has a tensile strength retention of 70% or higher after it is left under environments of 85° C. and 85% RH for 500 hours.

However, since it is difficult to implement the above characteristics only with the resin material, a material having a fiber-like filling material contained in the resin material is used.

Here, the resin composition that can be continuously used even at the temperature environments of −40° C. to 85° C. may include, but not particularly limited to, so-called engineering plastics such as poly ethylene terephthalate (PET), poly buthylene terephthalate (PBT), polyamide (PA) 6, polyamide 11, polyamide 12, polyamide 66, polyamide 610, polyamide 612, polyamide 46, polyamide 410, modified polyamide 6T, polyamide 9T and the like, and so-called super engineering plastic resins such as fluorine resin, polyphenylene sulfide (PPS), polyether sulfone (PES), polyether imide (PET), poly amide imide (PAI), thermoplastic polyimide, polyether ether ketone (PEEK), polyether nitrile (PEN) and the like, which may be used individually or in combination thereof. Among them, poly ethylene terephthalate (PET), polyamide 66, polyamide 46 and polyphenylene sulfide have favorable costs and good performance balances and thus may be preferably used. Also, for a utility requiring the heat resistance and the size stability, a thermosetting resin such as phenol resin, urea resin, unsaturated polyester resin, polyurethane resin and the like may be favorably used.

In the resin, the linear expansion coefficient in both the longitudinal and transverse directions of fibers within a temperature range of 23° C. to 80° C. is preferably within a range of $1.2 \times 10^{-5}$ to $5.5 \times 10^{-5}$ (1/° C.). When the linear expansion coefficient is smaller than $1.2 \times 10^{-5}$ (11° C.), since a linear expansion coefficient of the rear-side rolling bearing 23, which is press-fitted into the radially inner side of the intermediate plate 28, is $1.2 \times 10^{-5}$ (11° C.), a difference occurs between the linear expansion coefficient of the intermediate plate 28 and the linear expansion coefficient of the rear-side rolling bearing 23, so that a gap may occur between the cylindrical portion 40 and the outer diameter surface of the rear-side rolling bearing 23. On the other hand, when the linear expansion coefficient is larger than $5.5 \times 10^{-5}$ (1/° C.), the intermediate plate presses an output-side housing member 1a upon the expansion thereof, so that excessive load stress is generated. As a result, the intermediate plate 28 is damaged.

In the resin, the fiber-like filling material may include, but not particularly limited to, a glass fiber, a carbon fiber, a metallic fiber, an aramid fiber, an aromatic polyimide fiber, a liquid crystal polyester fiber, a silicon carbide fiber, an alumina fiber, a boron fiber and the like. Among them, the glass fiber and the carbon fiber have a favorable reinforcement ability and are thus preferable. As the glass fiber, an insulating glass fiber that less influences the electromagnetic induction of the torque measuring device 8 is more preferable.

A content of the fiber-like filling material in the entire composition is preferably 30 to 55 mass %, and more preferably 35 to 55 mass %. Even when the fiber-like filling material is mixed in excess of 55 mass %, the melting fluidity of the resin composition is remarkably lowered to thus deteriorate the moldability, further improvements on the mechanical properties and the size stability cannot be expected and the deformability of the material is considerably reduced, so that the intermediate plate 28 may be damaged when molding or assembling the intermediate plate 28. In contrast, when the content of the fiber-like filling material in the entire composition is smaller than 30 mass %, the reinforcement effect of the mechanical properties is small and the size stability is also insufficient. The size stability means that the linear expansion coefficient is within the range of $1.2 \times 10^{-5}$ to $5.5 \times 10^{-5}$ (11° C.) in both the longitudinal and transverse directions of fibers within the temperature range of 23° C. to 80° C. and the water absorption rate is 4% or lower when the intermediate plate is left in water at 23° C. for 24 hours.

Also, the fiber-like filling material of the resin configuring the intermediate plate 28 may be treated with a coupling agent such as a silane-based coupling agent, a titanate-based coupling agent and the like so as to have affinity between the resin and the fiber-like filling material to thus improve adhesiveness and dispersiveness of the resin and the fiber-like filling material or may be treated with surface treatment agents for the other purposes. However, the invention is not limited thereto.

In the meantime, a variety of additives may be mixed within a range not deteriorating the object of the invention. For example, a solid lubricant such as graphite, hexagonal boron nitride, fluorine mica, tetrafluoroethylene resin powder, tungsten disulfide, molybdenum disulfide and the like, inorganic powder, organic powder, lubricant oil, plasticizer, rubber, resin, antioxidant, thermal stabilizer, ultraviolet absorber, photoprotective agent, flame retardant, antistatic agent, mold release agent, flow modifier, thermal conductivity improver, non-tackifier, crystallization promoter, nucleating agent, pigment, dye and the like may be exemplified. When the polyester-based resin such as PET and PBT is applied as the base resin of the intermediate plate, the moisture absorption deterioration, specifically the hydrolysis deterioration may be concerned. Therefore, hydrolysis inhibitor is preferably added to increase the tolerance thereto. The hydrolysis inhibitor that is added to the polyester-based base resin applied to the intermediate plate is not particularly limited, and carbodiimide compound having one or more carbodiimide groups in a molecule, higher fatty acid, higher fatty acid insoluble salt, higher aliphatic alcohol and hydrophobizing agent such as hydrophobic silica or aromatic monofunctional epoxy compound containing one glycidyl group in a molecule, aromatic multifunctional epoxy compound containing two or more glycidyl groups in a molecule or piperidine derivative, piperadine derivative and the like may be favorably used. The hydrolysis inhibitor may be added to the polyester-based resin in an amount of 0.01 to 5 mass %, preferably 0.05 to 2 mass %. As a method of mixing the base resin, the fiber-like filling material and the additive, a method of impregnating continuous fiber bundles of the fiber-like filling material into a melted resin, in which a variety of additives except for the fiber-like filling material are mixed, and then cooling and pelletizing the same may be exemplified. Although a temperature upon the melt impregnation is not particularly limited, the temperature may be appropriately selected within a range of temperatures in which the resin becoming a base material is sufficiently melted and is not deteriorated.

A method of manufacturing the intermediate plate 28 is not particularly limited. For example, the intermediate plate 28 can be formed by the typical methods such as the injection molding, the compression molding, the transfer molding the like. Among them, the injection molding is preferable because it has high productivity and can provide the inexpensive intermediate plate 28. In the meantime, in order to suppress the damage of the fiber-like filling material upon the injection molding, it is preferable to make a nozzle diameter of an injection molding machine or gate diameter of a mold large or to suppress a back pressure to be low upon the molding.

The intermediate plate 28 can be made by the die-cast molding of a light-weight alloy such as aluminum alloy.

Figure 1:
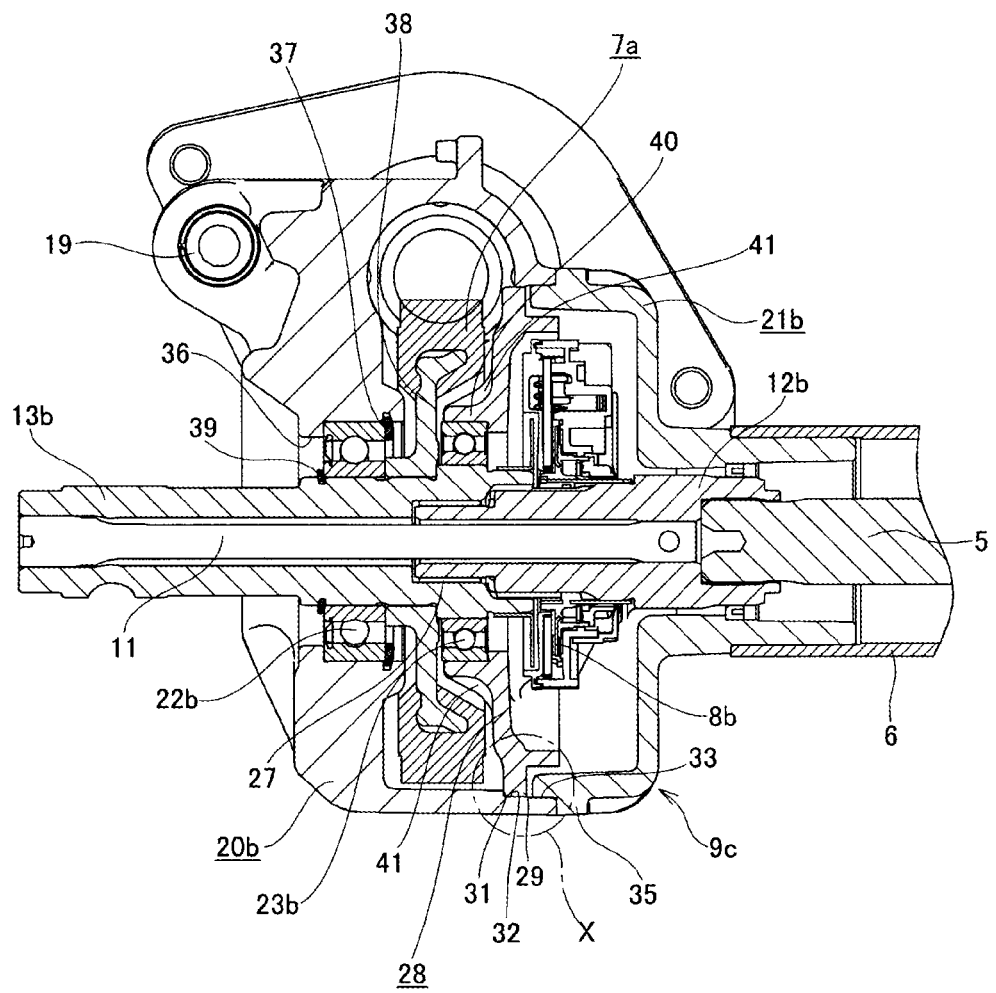
FIG. 1 is a sectional view of a part of an electric power steering apparatus according to a first embodiment of the invention.
Figure 2:
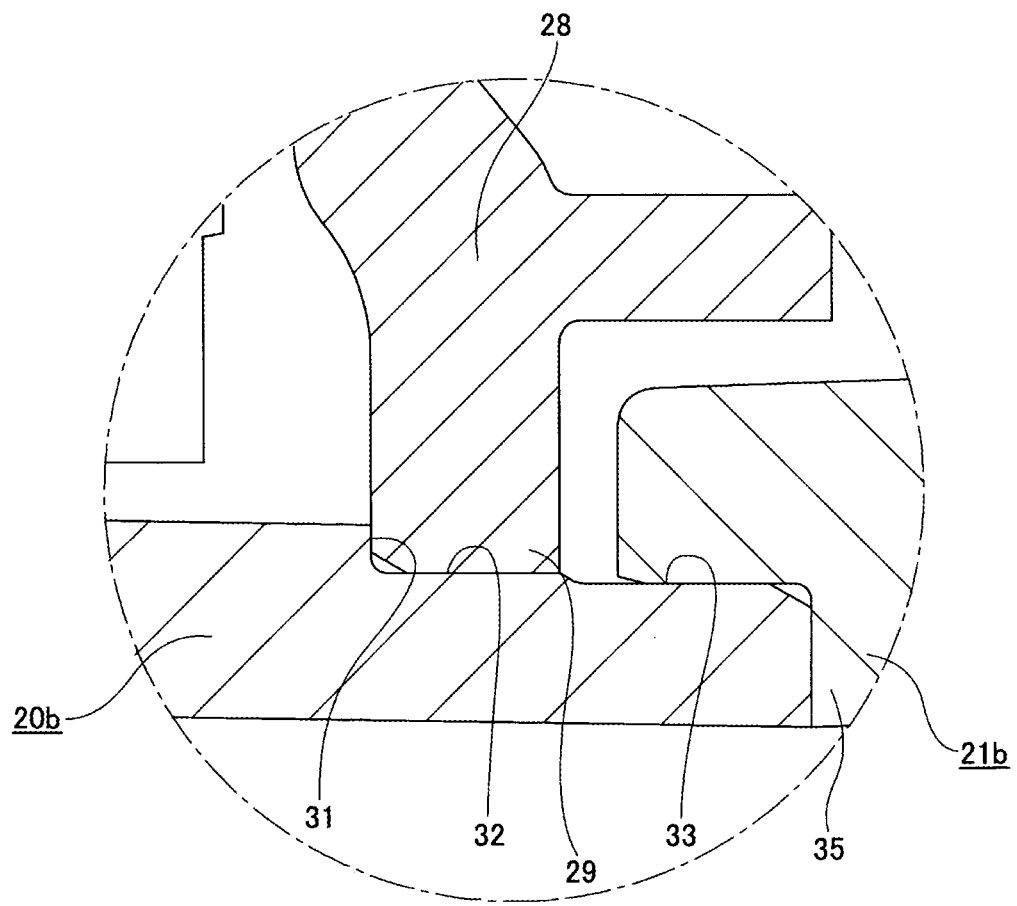
FIG. 2 is an enlarged view of the portion X of FIG. 1.
Figure 3:
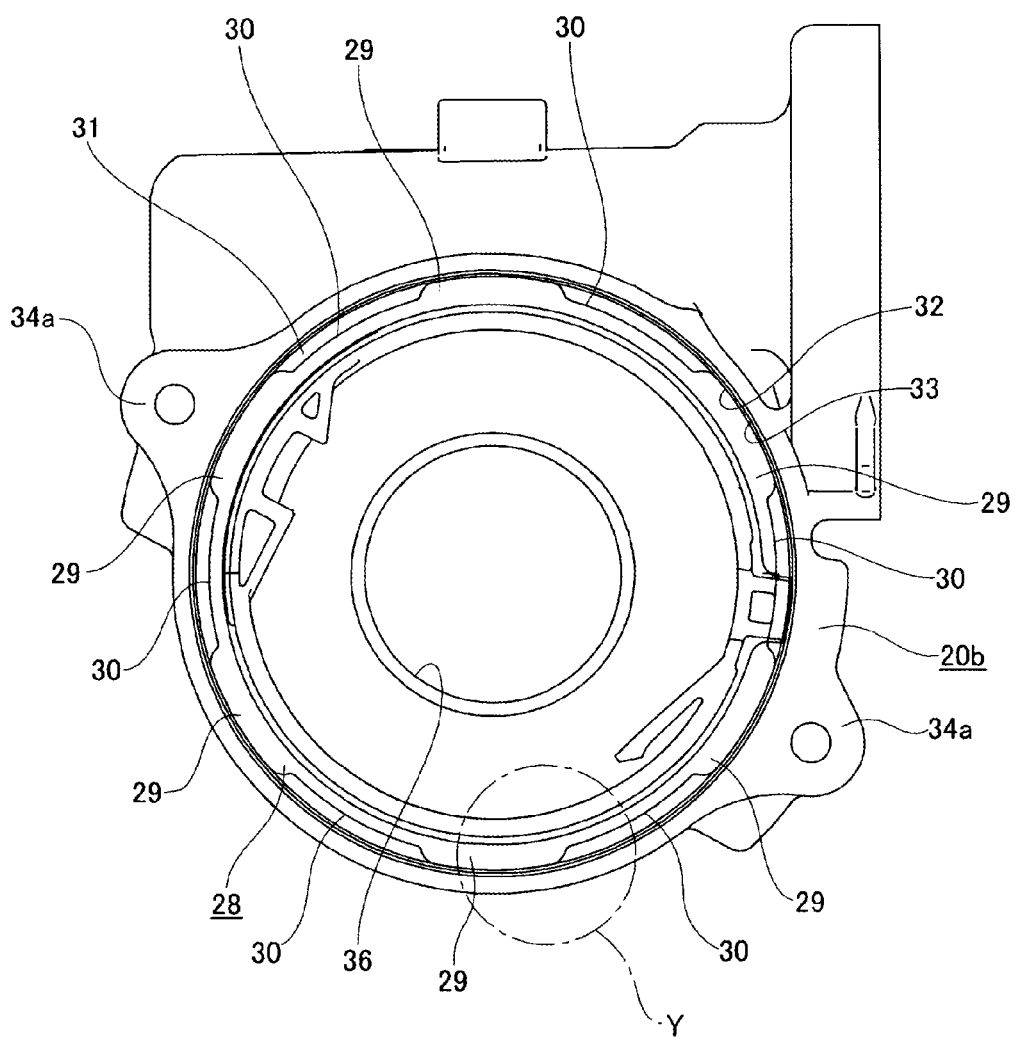
FIG. 3 is a rear view showing a state where an intermediate plate is press-fitted in a gear housing of the electric power steering apparatus, with other members being omitted.
Figure 4:
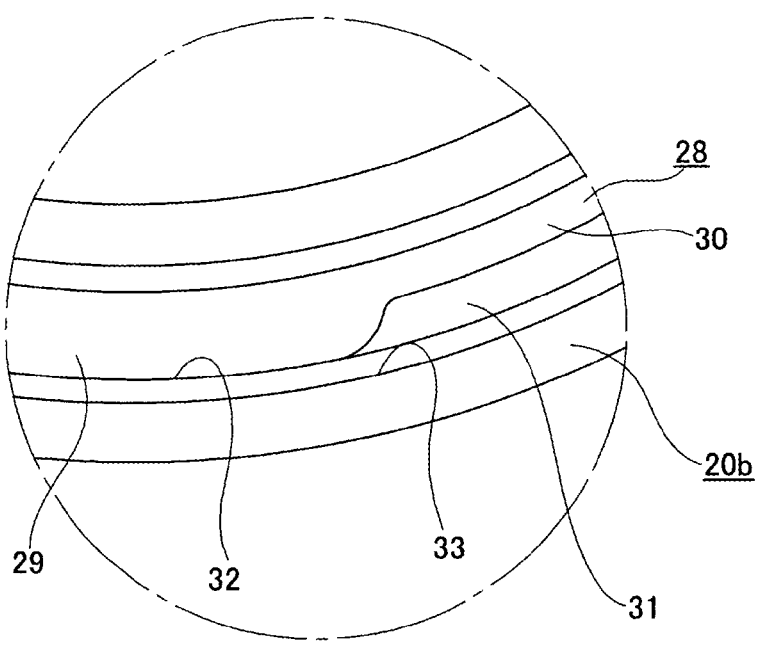
FIG. 4 is an enlarged view of the portion Y of FIG. 3.
Figure 5:
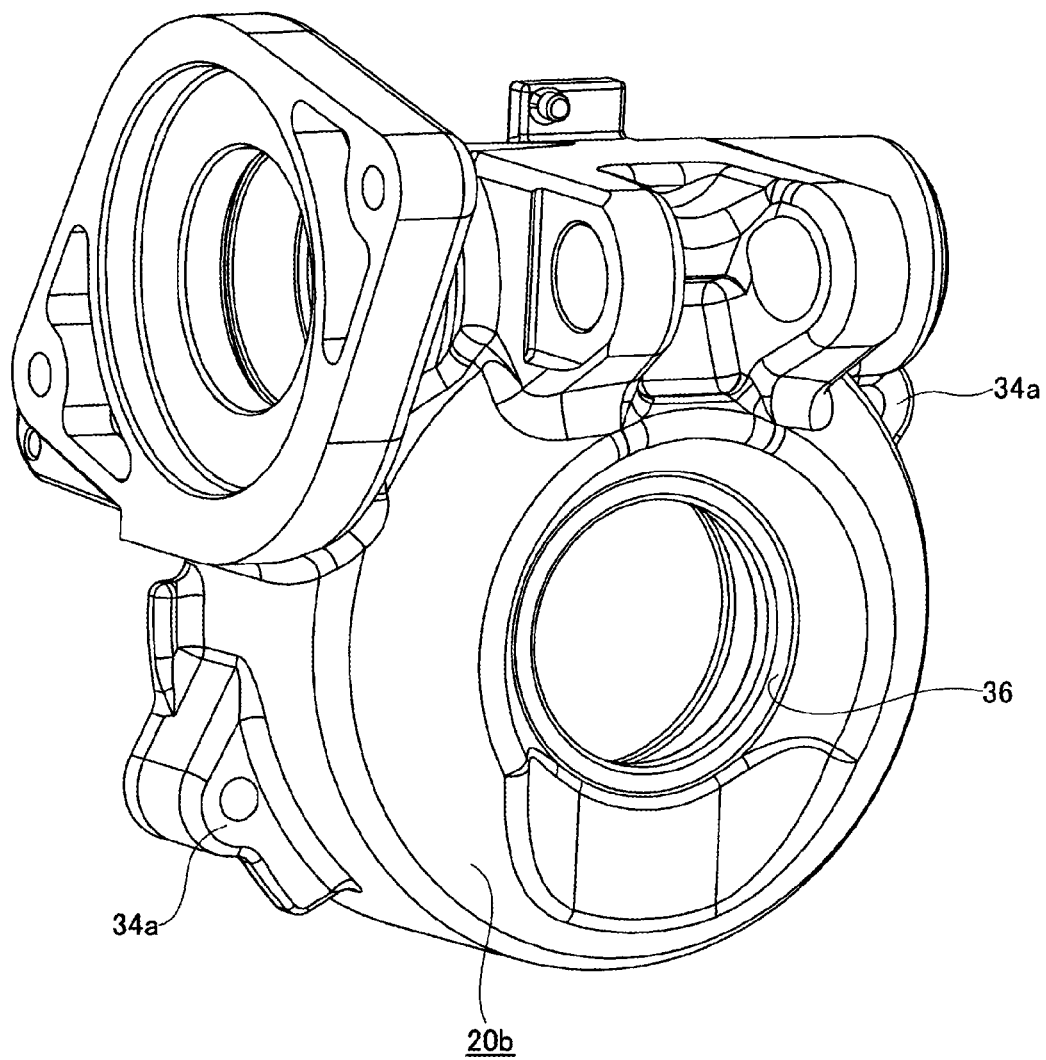
FIG. 5 is a front perspective view of the gear housing.
Figure 6:
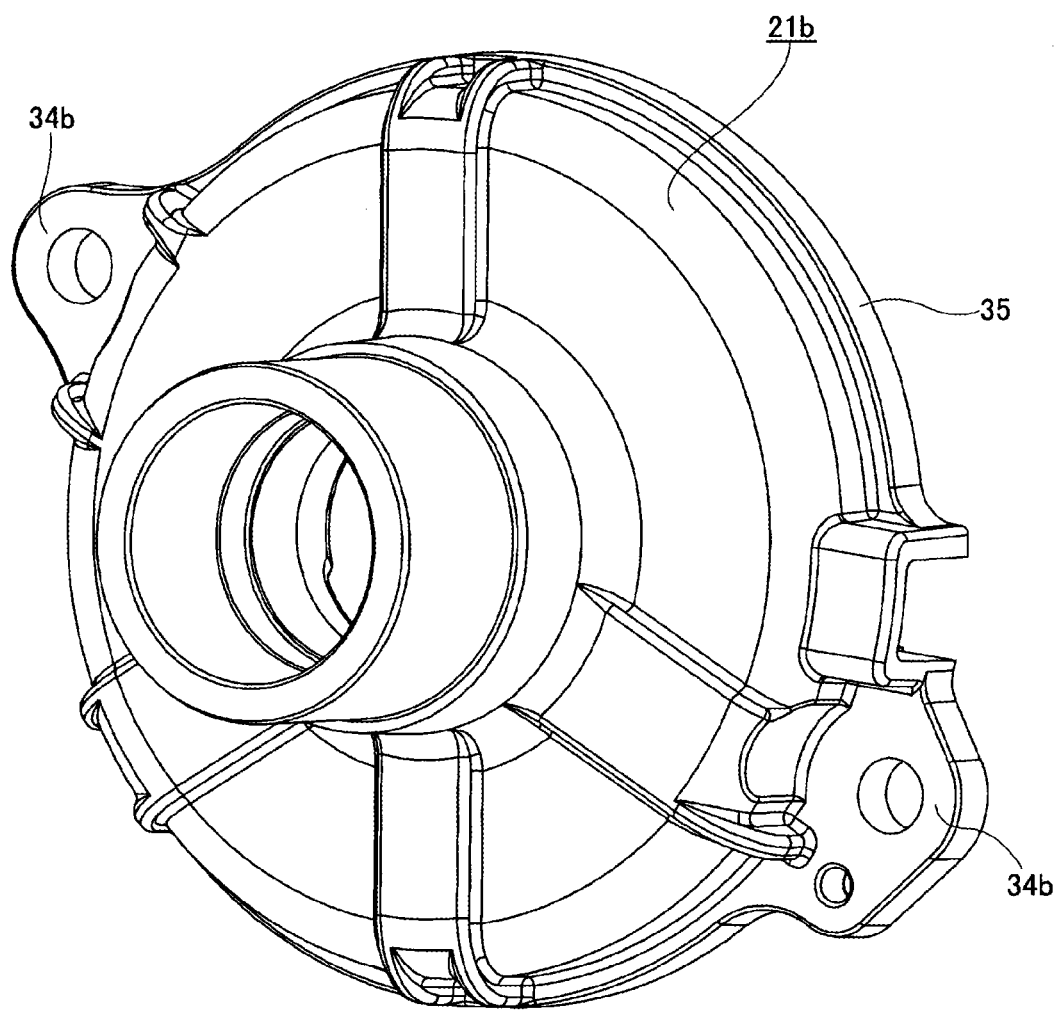
FIG. 6 is a rear perspective view of a housing cover of the electric power steering apparatus.
Figure 7A:
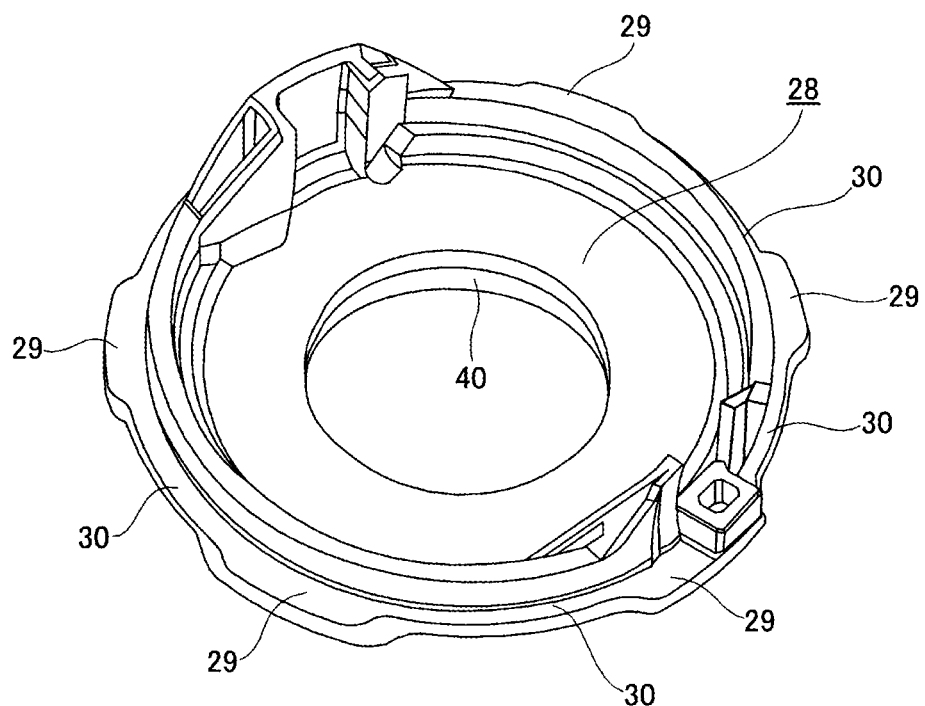
FIG. 7A is a rear perspective view of the intermediate plate.
Figure 7B:
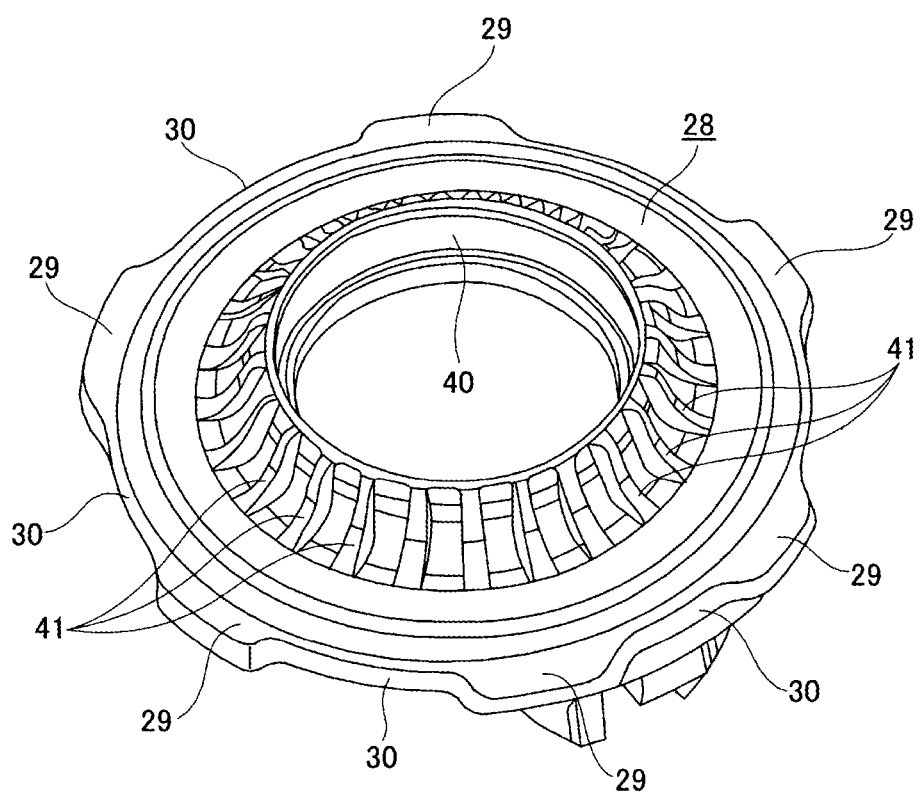
FIG. 7B is a front perspective view of the intermediate plate.
Figure 8:
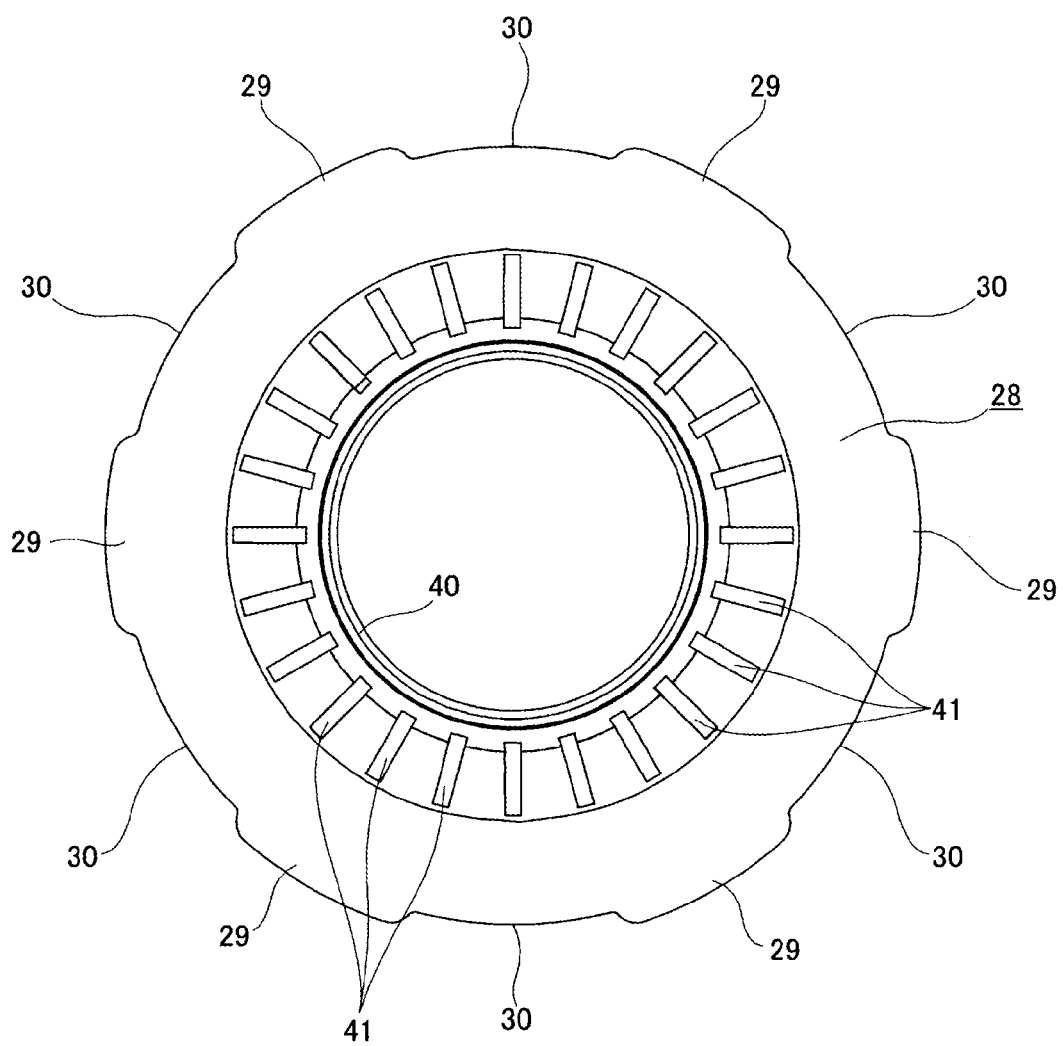
FIG. 8 is a front view of the intermediate plate.
Figure 9:
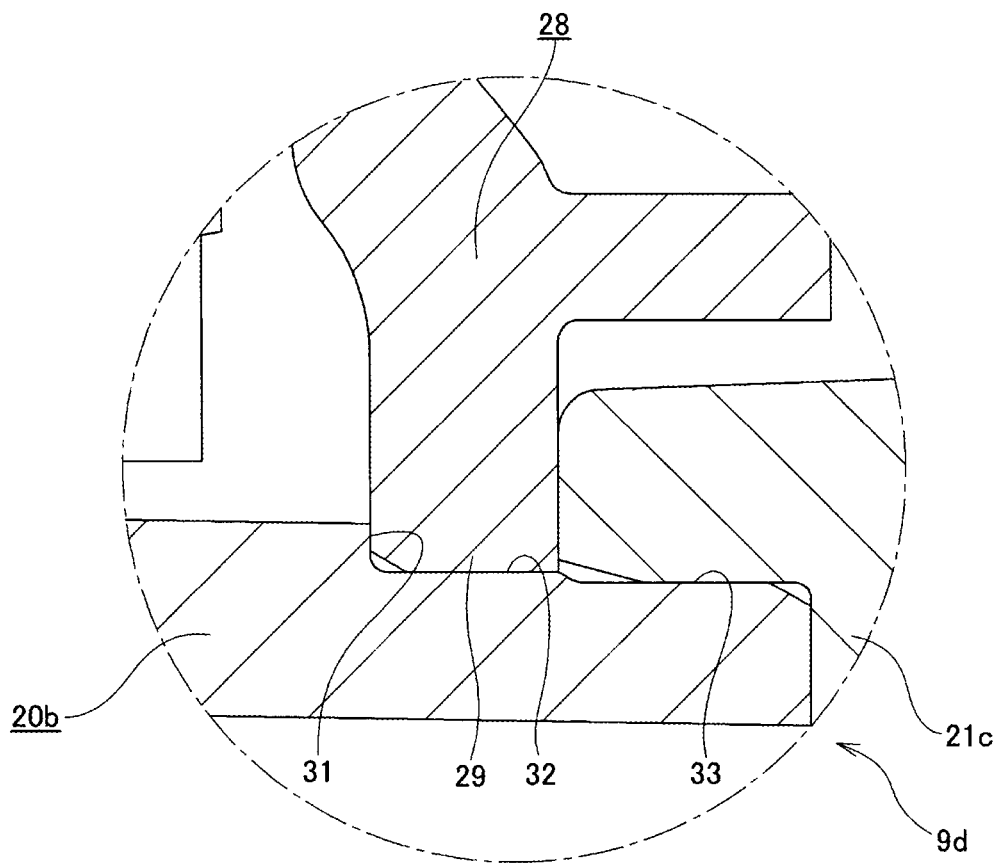
FIG. 9 is an enlarged view showing a second embodiment of the invention, which is the same as FIG. 2.

FIG. 9 shows a second embodiment of the invention. In this example, a front end surface of the housing cover 21*c* abuts on a rear surface outer peripheral edge part of the intermediate plate 28. Therefore, in this example, a fixing force of the intermediate plate 28 to the housing 9*d* becomes a sum of a frictional force, which is applied between the outer peripheries of the respective large diameter portions 29 (refer to FIGS. 3 and 8) formed on the outer peripheral edge of the intermediate plate 28 and the small diameter cylindrical surface part 32 of the gear housing 20*b* on the basis of the press-fitting, and a holding force by the step surface 31 of the gear housing 20*b* and the front end surface of the housing cover 21*c*. Hence, the fixing strength of the intermediate plate 28 to the housing 9*d* is increased. Since the configurations and operations of the other parts are the same as the first embodiment, the equivalent parts are indicated with the reference numerals and the overlapping descriptions thereof are omitted.

Figure 10:
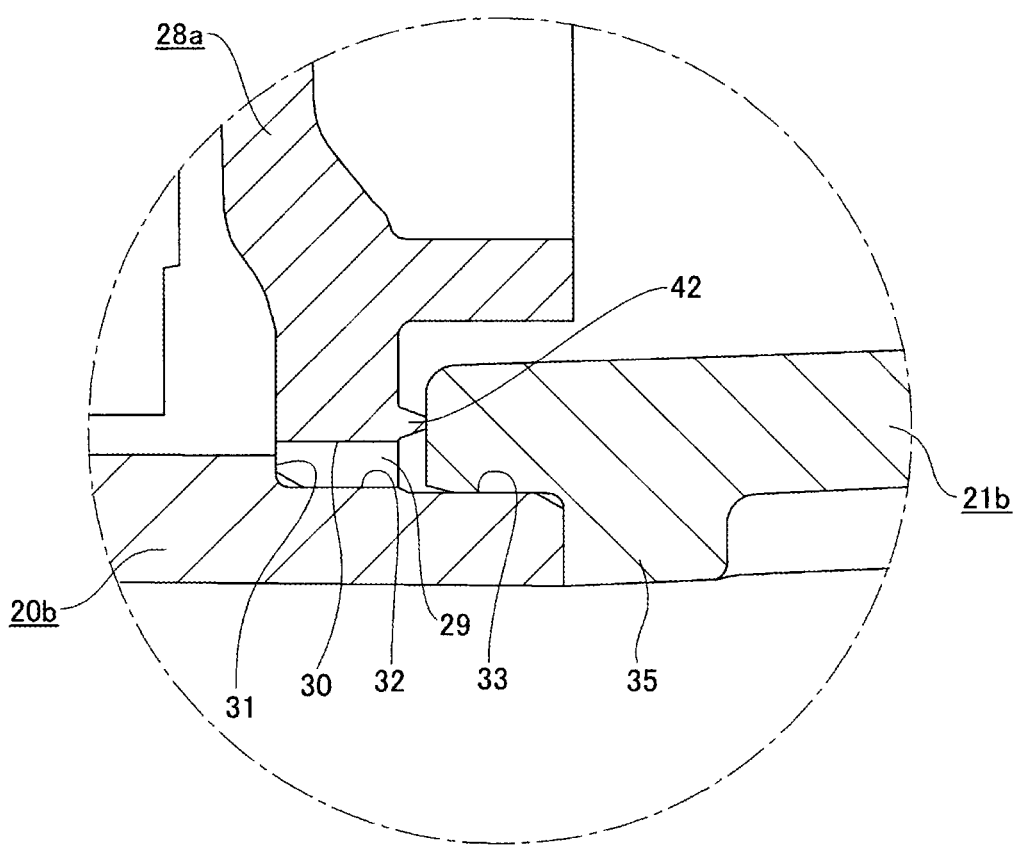
FIG. 10 is an enlarged view showing a third embodiment of the invention, which is the same as FIG. 2.
Figure 11A:
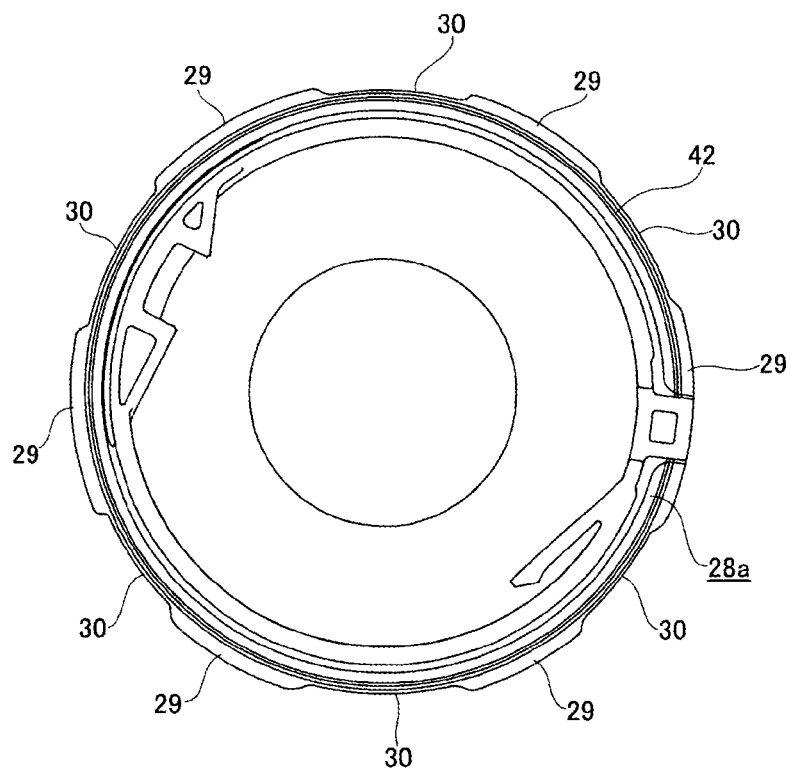
FIG. 11A is a rear view of an intermediate plate of the third embodiment.
Figure 11B:
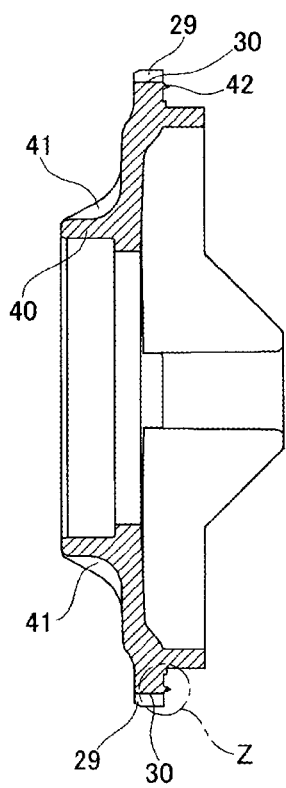
FIG. 11B is a sectional view of the intermediate plate of the third embodiment.
Figure 11C:
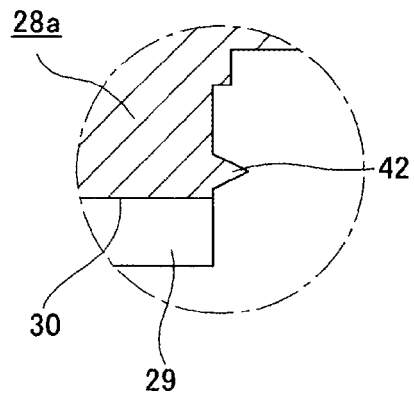
FIG. 11C is an enlarged view of the portion Z of FIG. 11B.

FIGS. 10 and 11 show a third embodiment of the invention. In this example, a rear side ridge 42 having a triangular sectional shape and a width in the radial direction reducing towards the distal end thereof is formed on a rear surface outer peripheral portion of an intermediate plate 28*a* over an entire circumference thereof. During the process of connecting and fixing the gear housing 20*b* and the housing cover 21*b*, the front end surface of the housing cover 21*b* is butted to the rear surface outer peripheral portion of the intermediate plate 28*a*, while flattening the rear side ridge 42 by the front end surface of the housing cover 21*b*.

In the above structure of this example, in order to connect and fix the gear housing 20*b* and the housing cover 21*b*, the rear side ridge 42 is flattened while screwing and fastening the bolts and nuts (or screw holes). For this reason, it is possible to prevent the bolts from being unfastened while suppressing the force necessary to fasten the bolts to be low (while reducing the loss of the axial force). Since the configurations and operations of the other parts are the same as the second embodiment, the illustrations and descriptions of the equivalent parts are omitted.

Figure 12:
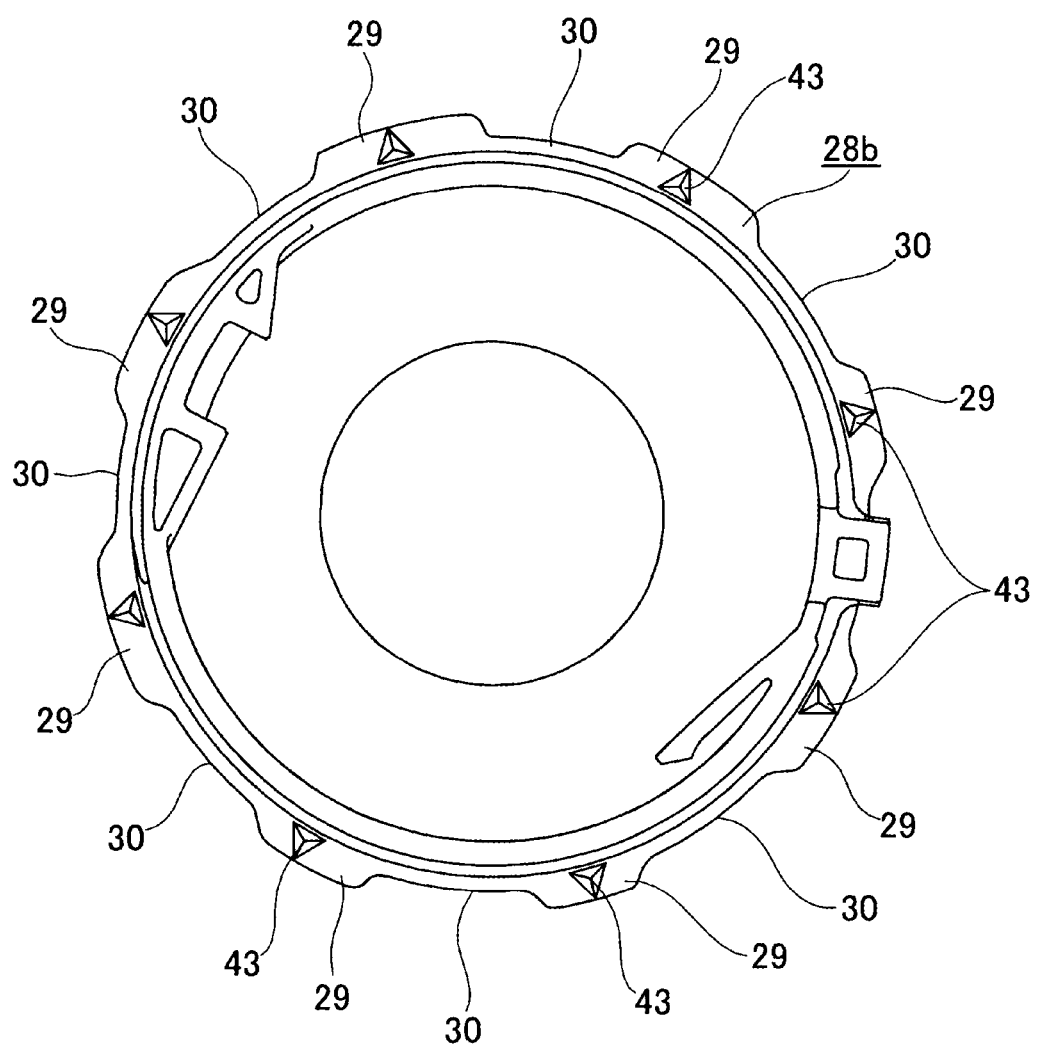
FIG. 12 is a rear view of an intermediate plate of a fourth embodiment.

FIG. 12 shows a fourth embodiment of the invention. In this example, rear side projections 43, 43 each of which has a triangular pyramid shape are formed at a plurality of positions equally spaced in the circumferential direction on the rear surface outer peripheral portion of the intermediate plate 28*b*. During the process of connecting and fixing the gear housing 20*b* and the housing cover 21*b* (see FIG. 10), the front end surface of the housing cover 21*b* is butted to the rear surface outer peripheral portion of the intermediate plate 28*a*, while flattening the respective rear side projections 43, 43 by the front end surface of the housing cover 21*b*.

In the above structure of this example, in order to connect and fix the gear housing 20*b* and the housing cover 21*b*, the respective rear side projections 43, 43 are flattened while screwing and fastening the bolts and nuts (or screw holes). For this reason, like the third embodiment, it is possible to prevent the bolts from being unfastened while suppressing the force necessary to fasten the bolts to be low. Since the configurations and operations of the other parts are the same as the second embodiment, the illustrations and descriptions of the equivalent parts are omitted.

Figure 13A:
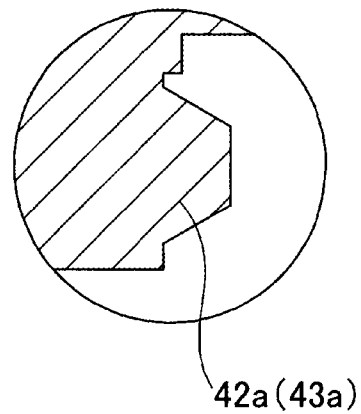
FIG. 13A is a partially enlarged sectional view showing another example of a sectional shape of a rear side ridge or rear side projection.
Figure 13B:
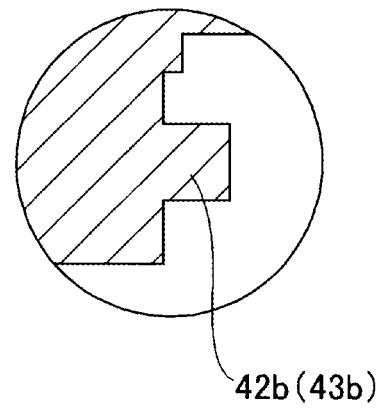
FIG. 13B is a partially enlarged sectional view showing still another example of the sectional shape of the rear side ridge or rear side projection.
Figure 13C:
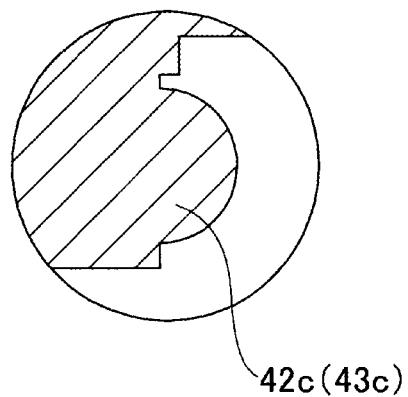
FIG. 13C is a partially enlarged sectional view showing further still another example of the sectional shape of the rear side ridge or rear side projection.
Figure 14:
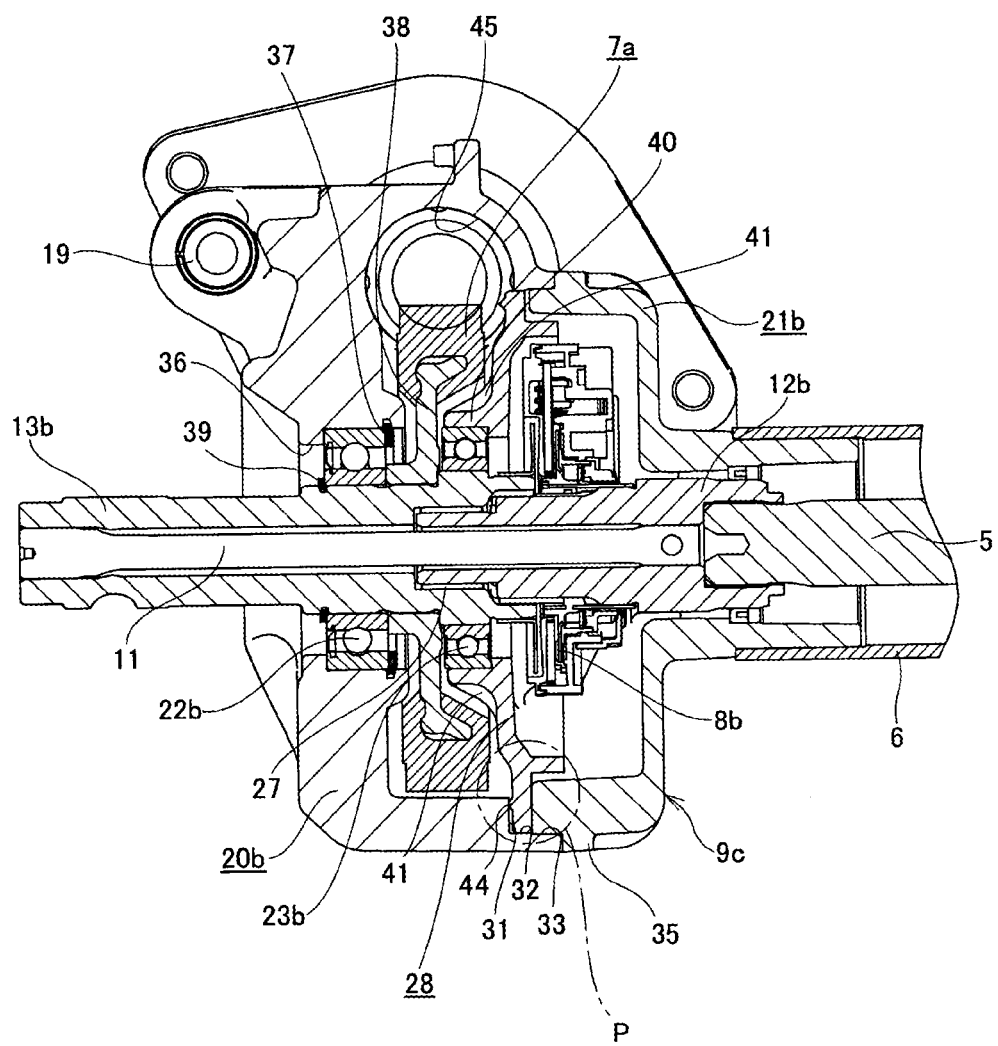
FIG. 14 is a partial sectional view of an electric power steering apparatus according to a fifth embodiment of the invention.
Figure 15:
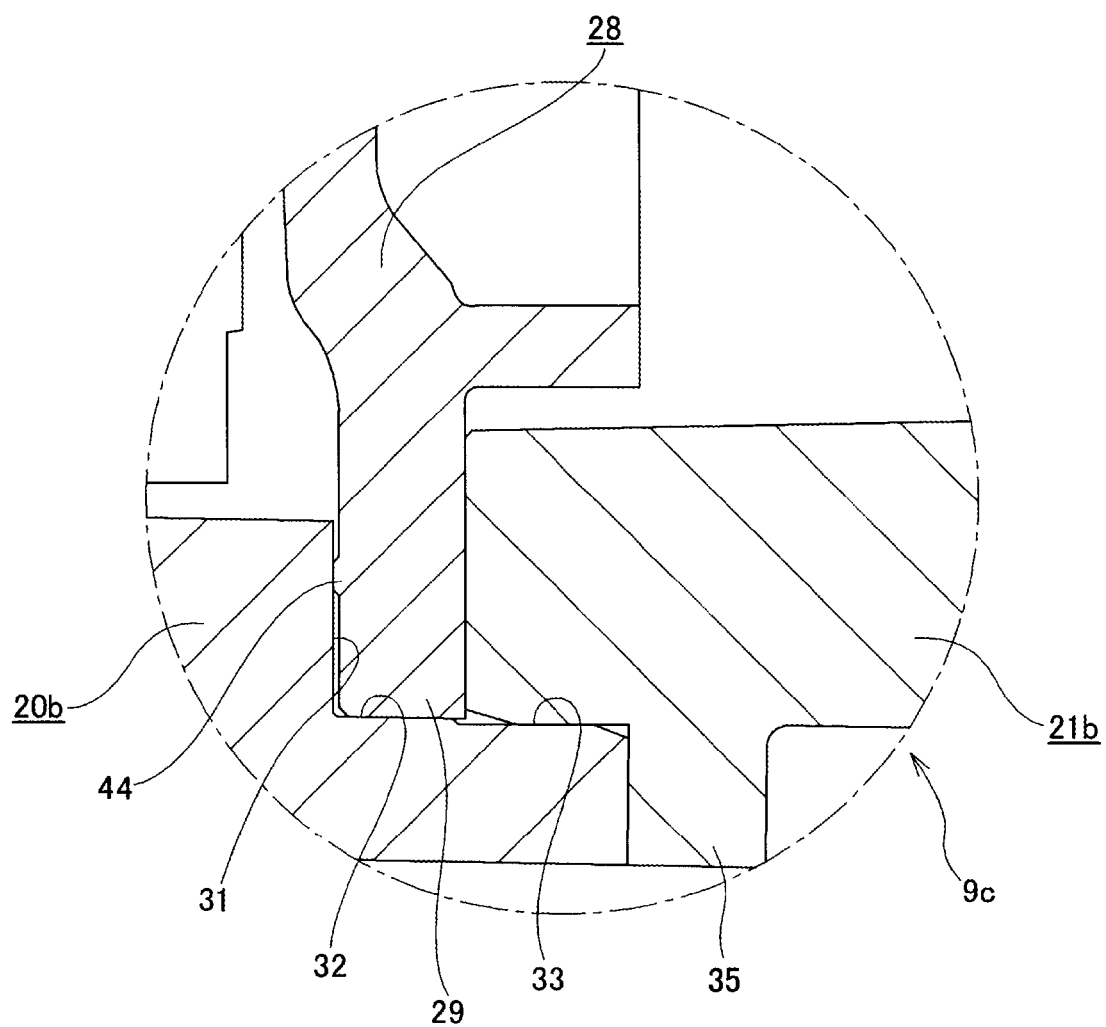
FIG. 15 is an enlarged view of the portion P of FIG. 14.
Figure 16A:
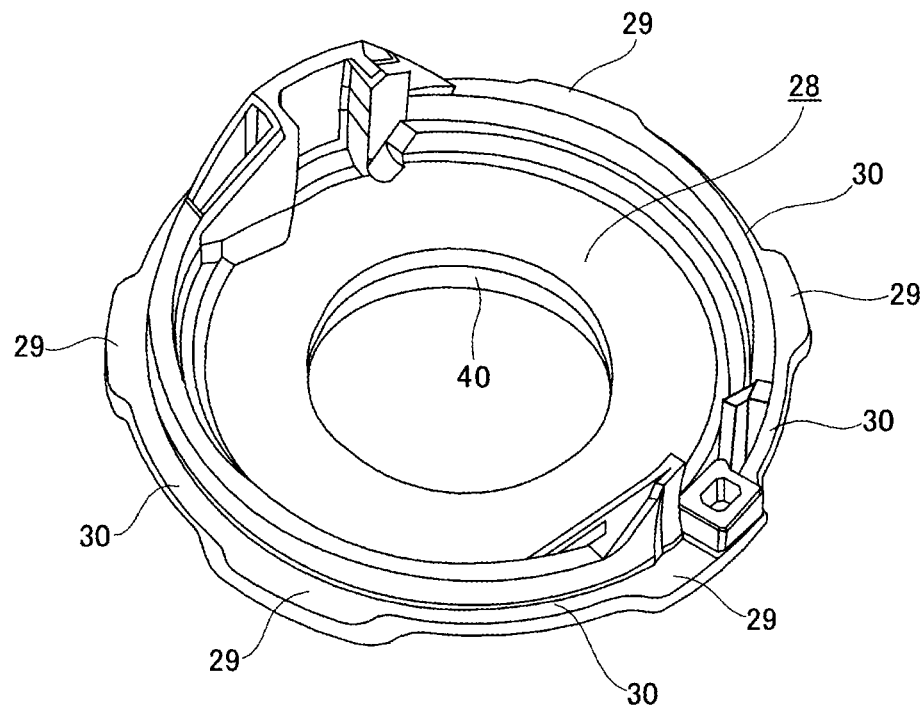
FIG. 16A is a rear perspective view of an intermediate plate of the fifth embodiment.
Figure 16B:
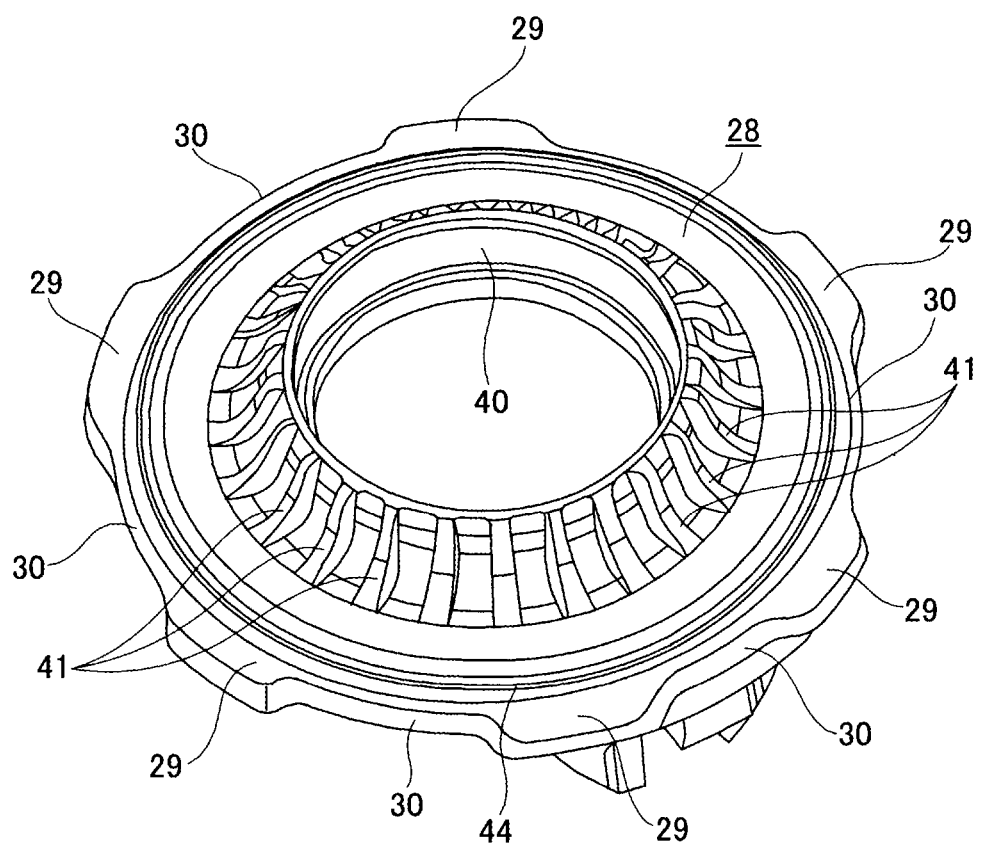
FIG. 16B is a front perspective view of the intermediate plate of the fifth embodiment.
Figure 17A:
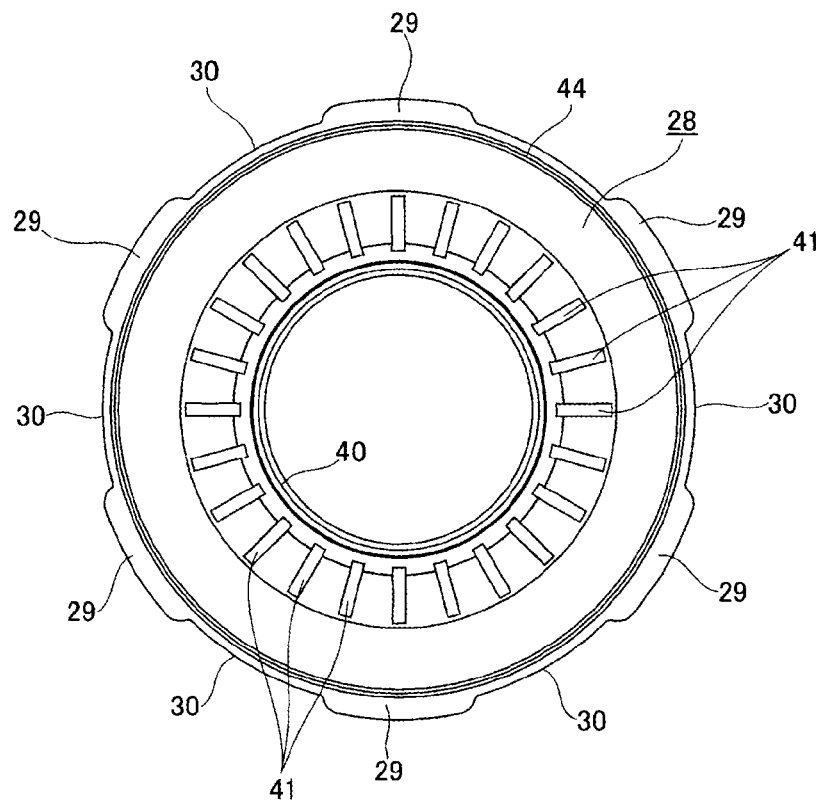
FIG. 17A is a front view of the intermediate plate of the fifth embodiment.
Figure 17B:
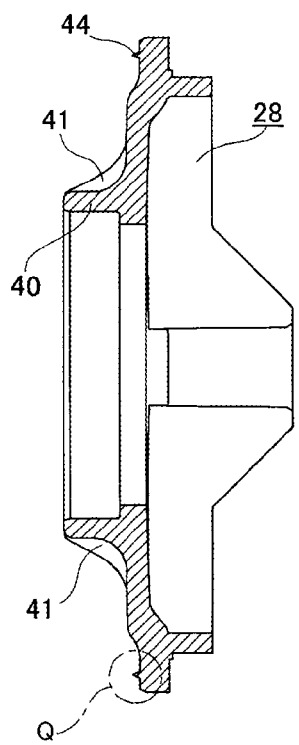
FIG. 17B is a sectional view of the intermediate plate of the fifth embodiment.
Figure 17C:
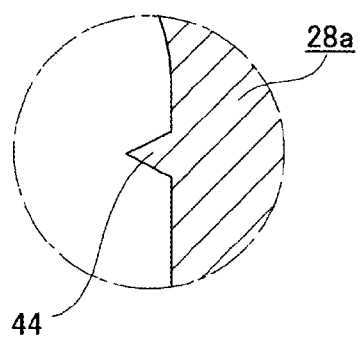
FIG. 17C is an enlarged view of the portion Q of FIG. 17B.
Figure 18A:
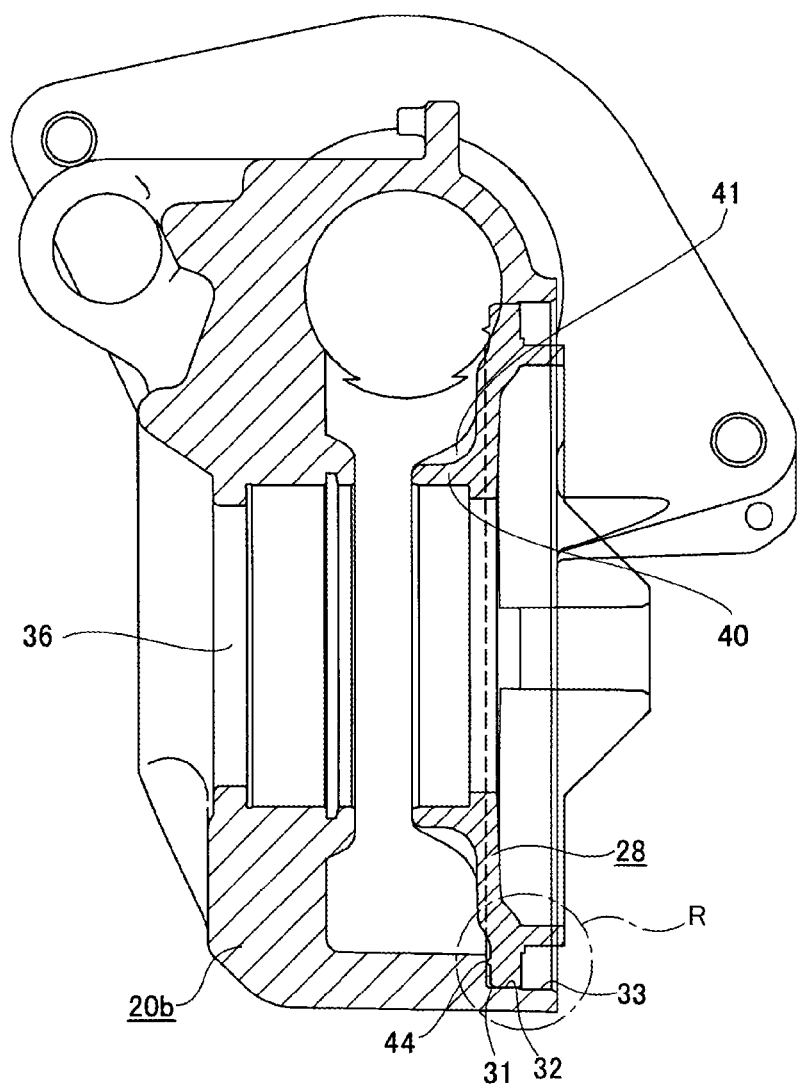
FIG. 18A is a sectional view showing a combined state of the gear housing and the intermediate plate.
Figure 18B:
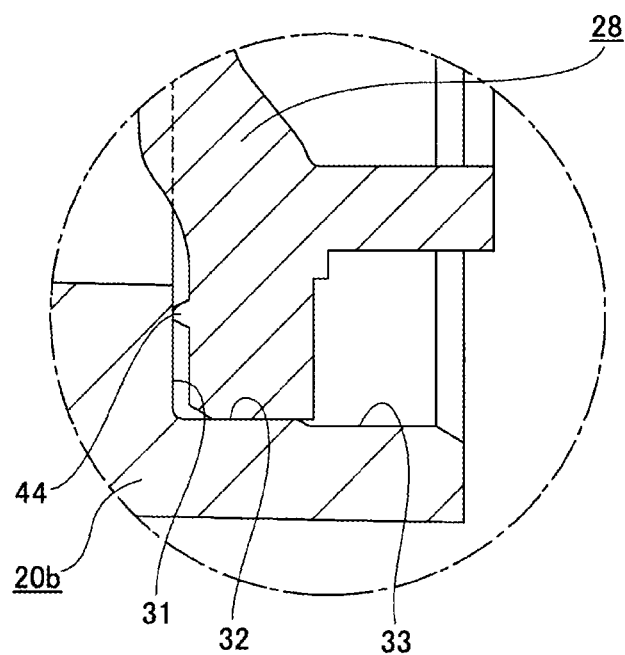
FIG. 18B is an enlarged view of the portion R of FIG. 18A.

Meanwhile, in the third and fourth embodiments, the sectional shape of the rear side ridge 42 or rear side projection 43 is not limited to the triangle. As long as a sectional shape can be appropriately flattened by the fastening of the bolts, a rear side ridge 42*a* having a trapezoidal sectional shape as shown in FIG. 13A (or a rear side projection 43*a* having a truncated cone shape), a rear side ridge 42*b* having a quadrilateral sectional shape as shown in FIG. 13B (or a rear side projection 43*b* having a cylindrical shape) or a rear side ridge 42*c* having a semicircular sectional shape as shown in FIG. 13C (or a rear side projection 43*c* having a semicircular shape) is also possible.

FIGS. 14 to 19 show a fifth embodiment of the invention. In the electric power steering apparatus of this example, the intermediate plate 28, which is made in the same manner as the gear housing 20*b* and the housing cover 21*b*, is press-fitted and fixed in the housing 9*c* by the interference fit. A portion of the intermediate portion of the output shaft 13*b* near the rear end is supported using the intermediate plate 28. The intermediate plate 28 has the plurality of large diameter portions 29 and the plurality of small diameter portions 30, which are alternately arranged at a plurality of positions (in the shown example, six positions, respectively) in the circumferential direction on the outer peripheral portion of the intermediate plate 28, respectively. The respective large diameter portions 29 are press-fitted to the rear inner peripheral surface of the gear housing 20*b* by the interference fit and are thus supported and fixed in the gear housing 20*b*. Also, a front side ridge 44 having a triangular sectional shape and a width in the radial direction reducing towards the distal end thereof is formed on a portion the front surface of the intermediate plate 28 near an outer diameter side (a portion slightly on a radially inner side than the peripheral edge of each small diameter portion 30) over an entire circumference thereof.

In order to butt a tip edge of the front side ridge 44 and to press-fit and fix the intermediate plate 28 at a predetermined position in the housing 9*c*, the portion of the inner peripheral surface of the gear housing 20*b* near the rear end opening is provided with the rearwardly facing step surface 31. A rear-side part of the step surface 31 of the inner peripheral surface of the gear housing 20*b* has a cylindrical shape having a step at which the small diameter cylindrical surface part 32 near the step surface 31 and the large diameter cylindrical surface part 33 of an opening-side far from the step surface 31 are made to continue by a small step part. An outer diameter of each large diameter portions 29 on the outer peripheral edge of the intermediate plate 28 at a free state is made to be slightly larger than an inner diameter of the small diameter cylindrical surface part 32 at a free state. An inner diameter of the large diameter cylindrical surface part 33 at a free state is made to be slightly larger than the outer diameter of each large diameter portions 29 at a free state. The intermediate plate 28 is press-fitted to the small diameter cylindrical surface part 32 at the respective large diameter portions 29 and the front side ridge 44 formed on the front surface of the intermediate plate 28 is butted to the step surface 31, so that the intermediate plate 28 is press-fitted and fixed at the predetermined position in the housing 9c. In this state, a tip of the front side ridge 44 is flattened by the step surface 31. Then, the step surface 31 and the front surface of the intermediate plate 28 are sealed therebetween.

The rear end opening portion of the gear housing 20b is blocked by the housing cover 21b. The outer peripheral surface of the gear housing 20b and the outer peripheral surface of the housing cover 21b are provided with the coupling flanges 34a, 34b at two diametrically opposite locations at which they are engaged to each other, respectively. In order to assemble the electric power steering apparatus of this example, the intermediate plate 28 is press-fitted and fixed in the gear housing 20b. By the press-fitting, the front side ridge 44 is pressed to the step surface 31, so that the tip thereof is flattened. The front end portion of the housing cover 21b is fitted to the inner side of the large diameter cylindrical surface part 33 of the rear end opening portion of the gear housing 20b without play, and the front surface of the flange portion 35 formed on the portion of the outer peripheral surface of the housing cover 21b near the front end is butted to the rear end surface of the gear housing 20b. In this state, the bolts inserted into the through-holes formed in the respective coupling flanges 34a, 34b and nuts (not shown) are screwed and fastened to connect and fix the gear housing 20b and the housing cover 21b each other, thereby configuring the housing 9c.

In this example, when mounting the output shaft 13b into the gear housing 20b, while the respective large diameter portions 29 formed on the outer peripheral edge of the intermediate plate 28 are press-fitted to the small diameter cylindrical surface part 32 of the gear housing 20b, the output shaft 13b is inserted into the inner ring of the front-side rolling bearing 22b from the rear towards the front, so that the rear end surface of the inner ring and the front end surface of the radially inner-side end portion of the worm wheel 38 abut each other. Since the respective large diameter portions 29 and the small diameter cylindrical surface part 32 are fitted to each other only at parts in the circumferential direction (in the shown example, a range smaller than a half of an entire circumference), it is possible to easily press-fit the intermediate plate 28 into the small diameter cylindrical surface part 32. Specifically, even when an interference, which is a difference between the inner diameter of the small diameter cylindrical surface part 32 and the outer diameter of each large diameter portion 29, is not strictly regulated, it is possible to easily press-fit the intermediate plate 28 into the small diameter cylindrical surface part 32. Also, after the press-fitting, it is possible to sufficiently secure the support strength of the intermediate plate 28 to the gear housing 20b.

In a state in which the intermediate plate 28 is supported and fixed in the gear housing 20b, a portion of the front side ridge 44 provided on the front surface of the intermediate plate 28 over the entire circumference, the portion other than an upper end portion of the gear housing 20b having the discontinuous step surface 31 corresponding to a space 45 for mounting the worm, is butted to the step surface 31 and is thus flattened. As a result, a gap between the step surface 31 and the part except for the upper end portion of the front surface of the intermediate plate 28 is completely removed. For this reason, it is possible to keep the sealability between the front surface of the intermediate plate 28 and the step surface 31 even though a separate seal member is not provided, so that it is possible to prevent the lubricant existing at a part, at which the worm decelerator 7a is mounted, from being leaked towards the mounting space of the torque measuring device 8b.

In this example, in the completely assembled electric power steering apparatus, as described above, since it is possible to prevent the lubricant existing at the part, at which the worm decelerator 7a is mounted, from being leaked towards the mounting space of the torque measuring device 8b even though a separate seal material is not provided, it is possible to configure a structure capable of preventing the malfunctions of the worm decelerator 7a and the torque measuring device 8b at low cost.

Figure 19A:
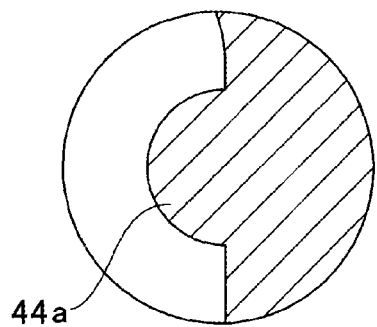
FIG. 19A is a partially enlarged view showing another example of a sectional shape of a front side ridge.
Figure 19B:
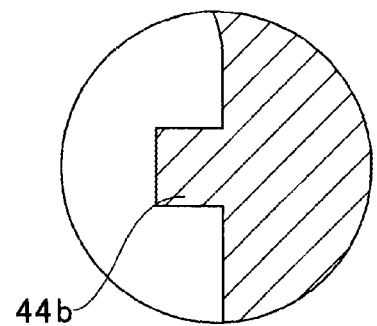
FIG. 19B is a partially enlarged view showing still another example of the sectional shape of the front side ridge.
Figure 19C:
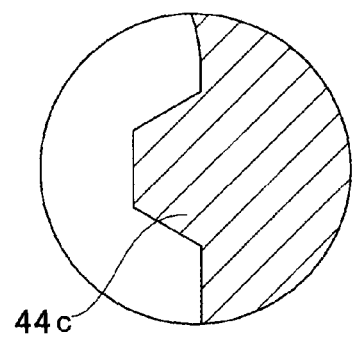
FIG. 19C is a partially enlarged view showing further still another example of the sectional shape of the front side ridge.

The sectional shape of the front side ridge 44 is not limited to the triangle. As long as a sectional shape can be appropriately flattened by the fastening of the bolts, a front side ridge 44a having a trapezoidal sectional shape as shown in FIG. 19A, a front side ridge 44b having a quadrilateral sectional shape as shown in FIG. 19B or a front side ridge 44c having a semicircular sectional shape as shown in FIG. 19C is also possible. Since the configurations and operations of the other parts are the same as the first embodiment, the illustrations and descriptions of the equivalent parts are omitted.

While embodiments of the invention have been described, the invention is not limited to the above embodiments and can be implemented with various changes within the range defined by the claims. The application is based on Japanese Patent Application No. 2012-237788 filed on Oct. 29, 2012 and Japanese Patent Application No. 2012-237789 filed on Oct. 29, 2012, the contents of which are incorporated herein by reference.

DESCRIPTION OF REFERENCE SIGNS

1: steering wheel
5, 5a: steering shaft
7, 7a: worm decelerator
10: electric motor
12, 12a, 12b: input shaft
13, 13a, 13b: output shaft
17: vehicle body
20, 20a, 20b: gear housing
21, 21a, 21b, 21c: housing cover
22, 22a, 22b: first rolling bearing
23, 23a, 23b: second rolling bearing
28, 28a, 28b: intermediate plate
29: large diameter portion
30: small diameter portion
31: step surface
36: through-hole
38: worm wheel
42, 42a, 42b, 42c: rear side ridge
43, 43a, 43b, 43c: rear side projection
44, 44a, 44b, 44c: front side ridge

The invention claimed is:
1. An electric power steering apparatus comprising:
an output shaft which rotates to apply a steering angle to wheels;
a gear housing having a through-hole inside which the output shaft is rotatably supported, the gear housing configured to accommodate a decelerator which reduces a speed of a rotation of a driving shaft of an electric motor to transmit the rotation to the output shaft;
a first rolling bearing and a second rolling bearing spaced from each other in an axial direction of the output shaft to rotatably support the output shaft on the gear housing;
a housing cover coupled to and secured to the gear housing, the housing cover configured such that an input shaft is inserted therein, the input shaft being rotated by a steering shaft to be rotated based on an operation of a steering wheel; and
an intermediate plate provided in the gear housing, wherein the first rolling bearing is provided between an inner peripheral surface of the through-hole and an outer peripheral surface of the output shaft, wherein the second rolling bearing is provided between an inner peripheral surface of the intermediate plate and the outer peripheral surface of the output shaft, wherein the intermediate plate has a plurality of large diameter portions and a plurality of small diameter portions, the large diameter portions and the small diameter portions being alternately arranged in a circumferential direction on an outer peripheral portion of the intermediate plate, and wherein the large diameter portions are press-fitted to a rear portion of an inner peripheral surface of the gear housing by interference fit such that the intermediate plate is supported and fixed in the gear housing.

2. The electric power steering apparatus according to claim 1, wherein the rear portion of the inner peripheral surface of the gear housing comprises a rearwardly facing step surface, and wherein a front surface of the outer peripheral portion of the intermediate plate abuts on the step surface such that the intermediate plate is positioned in the axial direction of the output shaft relative to the gear housing.

3. The electric power steering apparatus according to claim 2, wherein a front end surface of the housing cover abuts on a rear surface of the outer peripheral portion of the intermediate plate.

4. The electric power steering apparatus according to claim 3, wherein the rear surface of the outer peripheral portion of the intermediate plate is formed with a ridge in a circumferential direction, and wherein the ridge is flattened by the front end surface of the housing cover.

5. The electric power steering apparatus according to claim 3, wherein the rear surface of the outer peripheral portion of the intermediate plate is formed with a plurality of projections in a circumferential direction, and wherein the projections are flattened by the front end surface of the housing cover.

6. The electric power steering apparatus according to claim 1, wherein the rear portion of the inner peripheral surface of the gear housing comprises a rearwardly facing step surface, wherein a ridge is provided at a portion of a front surface of the intermediate plate facing the step surface, and wherein the ridge abuts on the step surface in a flattened manner.

7. The electric power steering apparatus according to claim 6, wherein a front end surface of the housing cover abuts on a rear surface of the outer peripheral portion of the intermediate plate.

8. The electric power steering apparatus according to claim 1, wherein the first rolling bearing is provided on an intermediate portion of the output shaft, and wherein the second rolling bearing is provided on a portion of the output shaft closer to a rear end of the output shaft than the intermediate portion.

9. The electric power steering apparatus according to claim 1, wherein the intermediate plate is made by an injection molding of a thermosetting resin or a thermoplastic resin containing glass fibers.

10. The electric power steering apparatus according to claim 1, wherein the intermediate plate comprises a cylindrical portion formed on a central portion of the intermediate plate, wherein an outer ring of the second rolling bearing is fitted and secured into the cylindrical portion, and wherein a location of the cylindrical portion of the intermediate plate and a location of the outer peripheral portion of the intermediate plate are shifted from each other in the axial direction.

11. The electric power steering apparatus according to claim 1, wherein the intermediate plate comprises a cylindrical portion formed on a central portion of the intermediate plate, wherein an outer ring of the second rolling bearing is fitted and secured into the cylindrical portion, and wherein a plurality of reinforcement ribs arranged side by side in the circumferential direction is formed between an outer peripheral surface of the cylindrical portion and a front surface of the intermediate plate.

* * * * *